United States Patent
Wolfe et al.

(10) Patent No.: US 12,325,358 B2
(45) Date of Patent: Jun. 10, 2025

(54) ELECTRONIC CONTROL FOR VEHICLE MIRROR

(71) Applicant: Boost Auto Parts LLC, West Chicago, IL (US)

(72) Inventors: Adam Wolfe, West Chicago, IL (US); Hung-Lung Chen, Tainan (TW)

(73) Assignee: Boost Auto Parts LLC, West Chicago, IL (US)

( * ) Notice: Subject to any disclaimer, the term of this patent is extended or adjusted under 35 U.S.C. 154(b) by 548 days.

(21) Appl. No.: 17/525,007

(22) Filed: Nov. 12, 2021

(65) Prior Publication Data

US 2023/0150432 A1     May 18, 2023

(51) Int. Cl.
| | |
|---|---|
| *B60R 1/074* | (2006.01) |
| *B60R 1/06* | (2006.01) |
| *B60R 1/072* | (2006.01) |
| *B60R 1/08* | (2006.01) |
| *B60R 1/12* | (2006.01) |

(52) U.S. Cl.
CPC ............ *B60R 1/074* (2013.01); *B60R 1/0602* (2013.01); *B60R 1/072* (2013.01); *B60R 1/081* (2013.01); *B60R 1/1207* (2013.01)

(58) Field of Classification Search
CPC ......... B60R 1/072; B60R 1/074; B60R 1/081; B60R 1/1207
USPC ......................................... 359/841, 843, 877
See application file for complete search history.

(56) References Cited

U.S. PATENT DOCUMENTS

| | | | | |
|---|---|---|---|---|
| 4,727,302 A | * | 2/1988 | Mizuta | B60R 16/023 318/567 |
| 5,796,176 A | * | 8/1998 | Kramer | B60R 1/02 701/49 |
| 5,835,291 A | * | 11/1998 | Takayama | B60R 1/078 359/872 |
| 5,886,838 A | * | 3/1999 | Kuramoto | B60R 1/07 359/881 |
| 6,193,380 B1 | * | 2/2001 | Jacobs | G08G 1/167 340/904 |
| 6,641,158 B2 | | 11/2003 | Leitner | |
| 6,755,543 B1 | * | 6/2004 | Foote | B60R 1/078 359/872 |
| 6,805,455 B2 | * | 10/2004 | Nielsen | B60R 1/078 359/877 |
| 6,830,257 B2 | | 12/2004 | Leitner | |
| 6,834,875 B2 | | 12/2004 | Leitner et al. | |

(Continued)

Primary Examiner — Ricky D Shafer
(74) Attorney, Agent, or Firm — Banner & Witcoff, Ltd.

(57) ABSTRACT

Aspects of this disclosure relate to side-view mirror assemblies in vehicles and associated mirror controllers. A side-view mirror assembly may be configured with mirror tilt, power extend/retract, and power fold/unfold functionalities that may be electronically controllable via a mirror controller. The mirror controller may be interfaced with a tilt control switch and the side-view mirror assembly. The mirror controller may be configured to receive commands, via the mirror tilt control switch, and activate and/or deactivate the power extend/retract and power fold/unfold functionalities. Based on activation of the power extend/retract and power fold/unfold functionalities, the mirror tilt control switch may be used to cause extension, retraction, folding, and/or unfolding of a side-view mirror.

16 Claims, 15 Drawing Sheets

(56) References Cited

U.S. PATENT DOCUMENTS

| | | | |
|---|---|---|---|
| 6,916,100 B2 * | 7/2005 | Pavao | B60R 1/07 359/872 |
| 6,938,909 B2 | 9/2005 | Leitner | |
| 6,942,233 B2 | 9/2005 | Eitner et al. | |
| 6,955,370 B2 | 10/2005 | Fabiano et al. | |
| 7,007,961 B2 | 3/2006 | Leitner et al. | |
| 7,017,927 B2 | 3/2006 | Henderson et al. | |
| 7,055,839 B2 | 6/2006 | Leitner | |
| 7,070,194 B2 | 7/2006 | Garland et al. | |
| 7,070,287 B2 | 7/2006 | Foote et al. | |
| 7,114,817 B2 * | 10/2006 | Evans | B60R 1/078 359/877 |
| 7,118,120 B2 | 10/2006 | Lee et al. | |
| 7,262,375 B2 | 8/2007 | Sakai | |
| 7,287,771 B2 | 10/2007 | Lee et al. | |
| 7,287,867 B2 * | 10/2007 | Wellington | B60R 1/07 359/865 |
| 7,318,596 B2 | 1/2008 | Scheuring, III et al. | |
| 7,360,908 B1 * | 4/2008 | Duroux | B60R 1/074 359/877 |
| 7,380,807 B2 | 6/2008 | Leitner | |
| 7,398,985 B2 | 7/2008 | Leitner et al. | |
| 7,413,204 B2 | 8/2008 | Leitner | |
| 7,441,790 B2 | 10/2008 | Lechkun | |
| 7,487,986 B2 | 2/2009 | Leitner et al. | |
| 7,566,064 B2 | 7/2009 | Leitner et al. | |
| 7,584,975 B2 | 9/2009 | Leitner | |
| 7,594,672 B2 | 9/2009 | Piotrowski | |
| 7,637,519 B2 | 12/2009 | Leitner et al. | |
| 7,712,755 B2 | 5/2010 | Yang et al. | |
| 7,823,896 B2 | 11/2010 | VanBelle et al. | |
| 7,976,042 B2 | 7/2011 | Watson et al. | |
| 8,042,821 B2 | 10/2011 | Yang et al. | |
| 8,052,162 B2 | 11/2011 | Yang et al. | |
| 8,157,277 B2 | 4/2012 | Leitner et al. | |
| 8,408,571 B2 | 4/2013 | Leitner et al. | |
| 8,469,380 B2 | 6/2013 | Yang et al. | |
| 8,602,431 B1 | 12/2013 | May | |
| 8,662,512 B2 | 3/2014 | May | |
| 8,833,782 B2 | 9/2014 | Huotari et al. | |
| 8,844,957 B2 | 9/2014 | Leitner et al. | |
| 9,205,781 B1 | 12/2015 | May | |
| 9,272,667 B2 | 3/2016 | Smith | |
| 9,302,626 B2 | 4/2016 | Leitner et al. | |
| 9,308,870 B2 | 4/2016 | Yang et al. | |
| 9,511,717 B2 | 12/2016 | Smith | |
| 9,522,634 B1 | 12/2016 | Smith | |
| 9,527,449 B2 | 12/2016 | Smith | |
| 9,561,751 B2 | 2/2017 | Leitner et al. | |
| 9,573,467 B2 | 2/2017 | Chen et al. | |
| 9,834,147 B2 | 12/2017 | Smith | |
| 9,944,231 B2 | 4/2018 | Leitner et al. | |
| 10,053,017 B2 | 8/2018 | Leitner et al. | |
| 10,059,268 B2 | 8/2018 | Hayes et al. | |
| 10,077,002 B2 | 9/2018 | Okuyama | |
| 10,077,016 B2 | 9/2018 | Smith et al. | |
| 10,106,088 B2 | 10/2018 | Smith | |
| 10,118,557 B2 | 11/2018 | Pribisic | |
| 10,183,624 B2 | 1/2019 | Leitner et al. | |
| 10,195,997 B2 | 2/2019 | Smith | |
| 10,272,842 B2 | 4/2019 | Du et al. | |
| 10,322,677 B1 | 6/2019 | Leitner et al. | |
| 10,513,224 B2 | 12/2019 | Smith | |
| 10,596,971 B2 | 3/2020 | Leitner et al. | |
| 10,618,472 B2 | 4/2020 | Du et al. | |
| 10,682,960 B2 | 6/2020 | Du et al. | |
| 10,759,349 B2 | 9/2020 | Leitner | |
| 10,773,648 B2 | 9/2020 | Salter et al. | |
| 10,773,670 B2 | 9/2020 | Smith et al. | |
| 10,913,397 B2 | 2/2021 | Pribisic | |
| 11,180,100 B2 | 11/2021 | Smith et al. | |
| 11,198,395 B2 | 12/2021 | Smith | |
| 11,208,044 B2 | 12/2021 | Smith et al. | |
| 11,279,290 B2 | 3/2022 | Eitner | |
| 2003/0214738 A1 * | 11/2003 | Yamada | B60R 1/07 359/877 |
| 2004/0109247 A1 | 6/2004 | Wang | |
| 2007/0030581 A1 * | 2/2007 | Wang | B60R 1/02 359/872 |
| 2009/0182469 A1 * | 7/2009 | Tucker | B60R 1/025 359/872 |
| 2012/0162798 A1 * | 6/2012 | Takemasa | B60R 1/074 359/877 |
| 2018/0290594 A1 * | 10/2018 | Abdel-Rahman | B60R 1/0607 |
| 2019/0161014 A1 | 5/2019 | Ko et al. | |
| 2020/0377020 A1 * | 12/2020 | Ramgopal | B60K 35/265 |

* cited by examiner

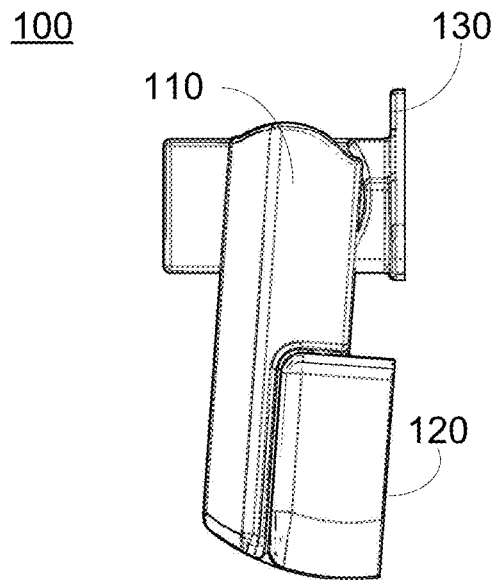
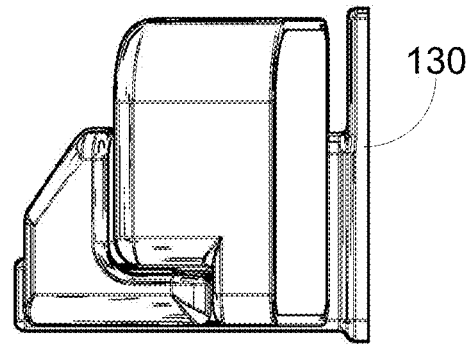
FIG. 1A  FIG. 1B
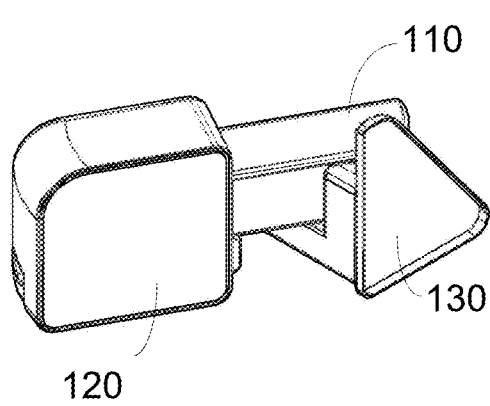
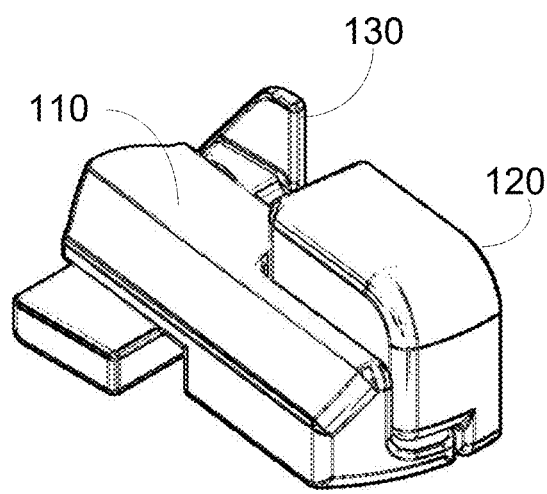
FIG. 1C  FIG. 1D

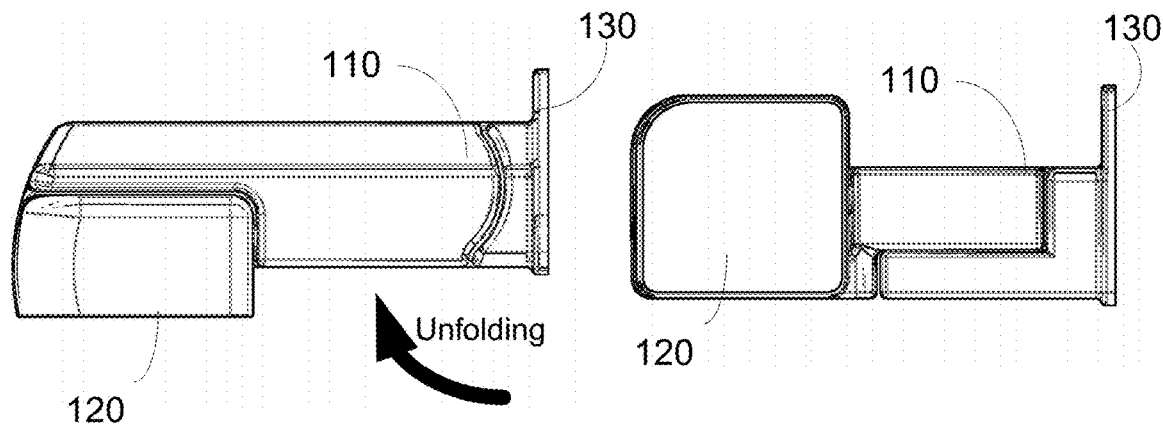
FIG. 2A  FIG. 2B
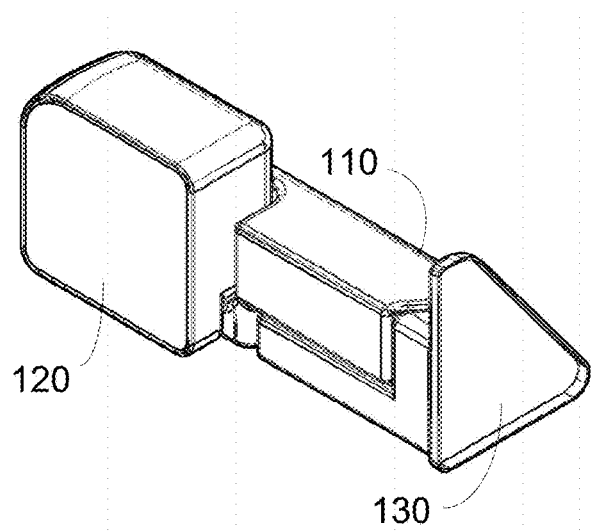 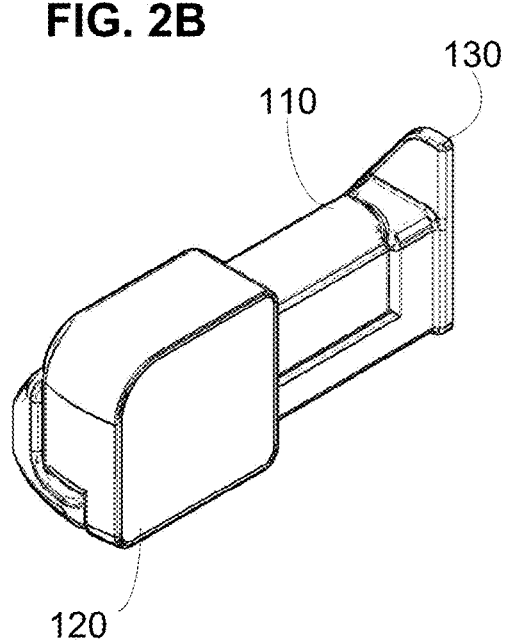
FIG. 2C  FIG. 2D

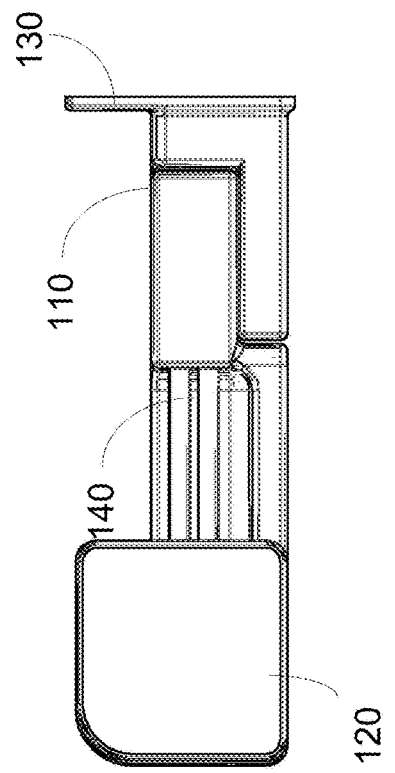
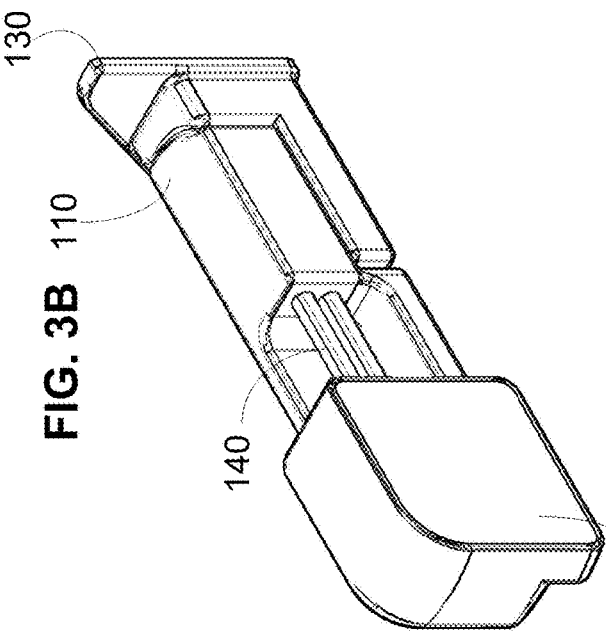
FIG. 3A
FIG. 3B
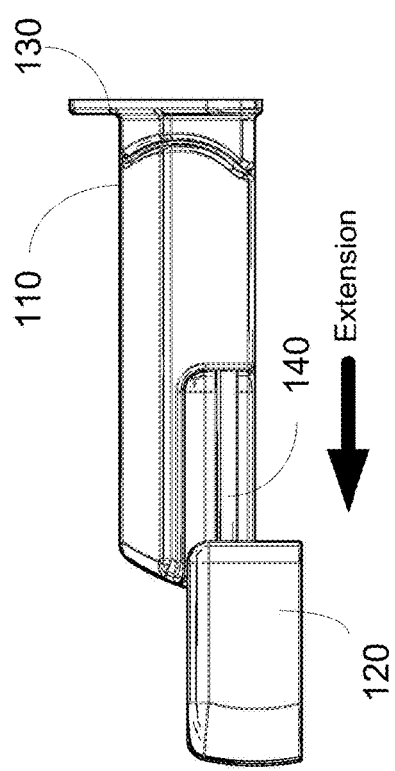
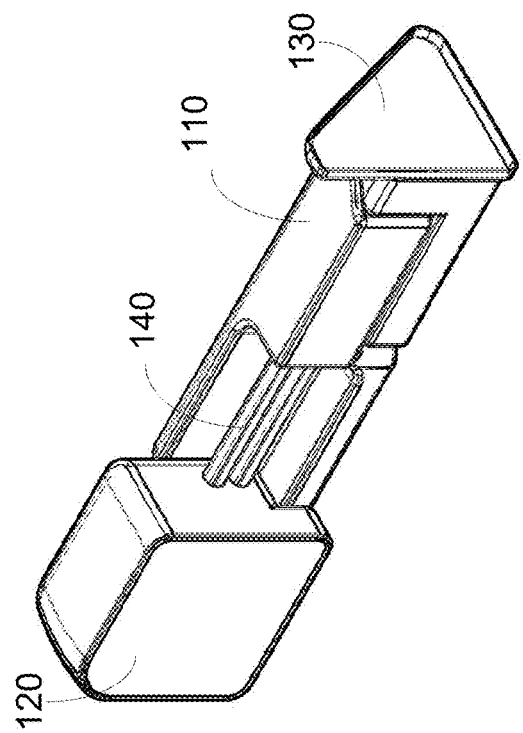
FIG. 3C
FIG. 3D

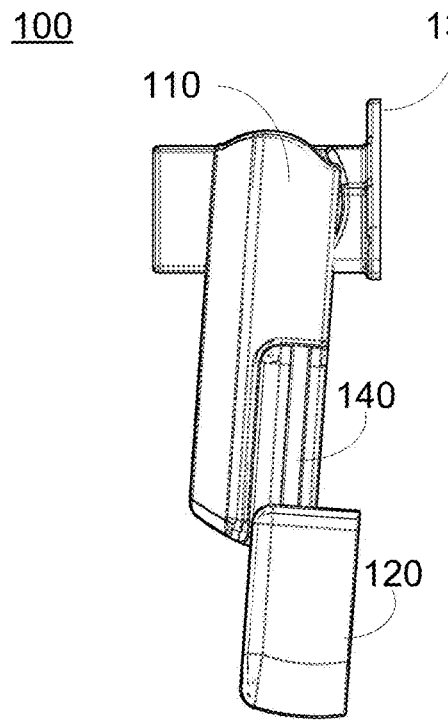
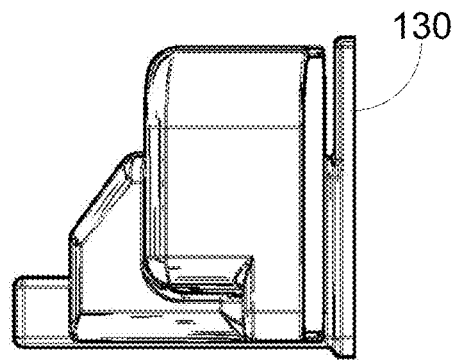
FIG. 4A
FIG. 4B
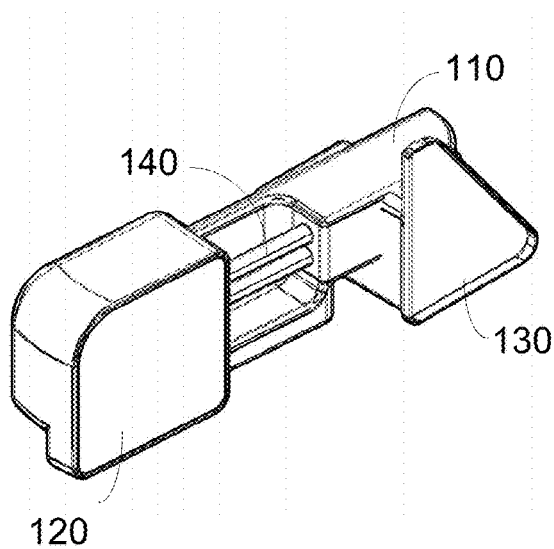
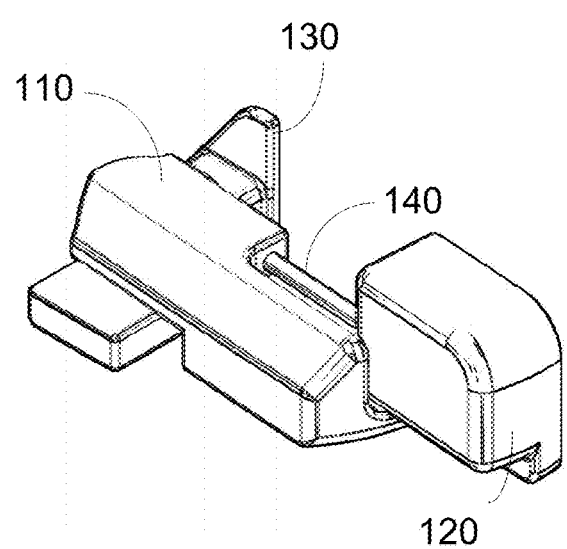
FIG. 4C
FIG. 4D

ELECTRONIC CONTROL FOR VEHICLE MIRROR

TECHNICAL FIELD

Aspects described herein generally relate to vehicle side-view mirrors and more specifically to electronic control of positioning of vehicle side-view mirrors.

BACKGROUND

A vehicle may be equipped with side-view mirrors to enable drivers to be aware of the vehicle's sides and rear. The side-view mirrors may be foldable to enable compact stowage when the vehicle is not in use. In some vehicles (e.g., trucks, semi-trailer trucks, vehicles used for towing, etc.), side-view mirror assemblies may comprise extendable arms that enable the mirrors to laterally extend away from the vehicle. The lateral extension may allow a driver a better view of the vehicle's surroundings through an increased viewing angle.

SUMMARY

The following presents a summary in order to provide a general understanding of various aspects of the disclosure. The summary is not an exhaustive overview of the disclosure and is not intended to limit the scope of any inventive concepts described herein.

Aspects of this disclosure relate to electronic control of vehicle mirrors. For example, side-view mirror assemblies in vehicles and associated mirror controllers are described. A side-view mirror assembly may be configured with mirror tilt, power extend, and/or power fold functionalities that may be electronically controllable via one or more mirror controllers. A mirror controller may be interfaced with a switch (e.g., a tilt control switch), one or more side-view mirrors, and/or an assembly thereof. A mirror controller may be configured to receive one or more commands (e.g., that may be input via the mirror tilt control switch) to activate and/or deactivate one or more functionalities, such as a power extend/retract function and/or a power fold/unfold function. Based on activation of a power extend/retract function and/or a power fold/unfold function, one or more switches (e.g., a mirror tilt control switch) may be used to cause extension, retraction, folding, and/or unfolding of one or more side-view mirrors. As described further herein, a vehicle with (or without) an existing mirror tilt switch may be improved with application of one or more electronic control modules to add extension, retraction, folding, and/or unfolding operations for one or more vehicle mirrors (e.g., driver-side mirror and/or passenger-side mirror). The additional extension, retraction, folding, and/or unfolding functionality may enhance an existing tilt switch functionality without replacing an existing tilt switch, and thereby, without changing an appearance of (and/or external-facing hardware of) a vehicle. A first electronic control module (e.g., a driver-side module) may control a first mirror assembly (e.g., comprising a driver-side mirror). A second electronic control module (e.g., a passenger-side module) may control a second mirror assembly (e.g., comprising a passenger-side mirror). The first electronic control module may be installed inside the front driver-side door, such that it may not appear visible in the interior of the vehicle after installation. The second electronic control module may be installed inside the front passenger-side door, such that it may not appear visible in the interior of the vehicle after installation. The first electronic control module may communicate with (and/or control one or more operations of) the second electronic control module. For example, the first electronic control module may wirelessly send one or more commands (e.g., via radio frequency) to control extension, retraction, folding, unfolding, and/or tilt (e.g., left, right, up, down) functions of the second mirror assembly (e.g., of a passenger-side mirror), which may be in addition to wired (or wireless) control of extension, retraction, folding, unfolding, and/or tilt functions of the first mirror assembly. The first electronic control module and/or the second electronic control module may be activated and/or deactivated via one or more commands (e.g., one or more predetermined sequences) that may override one or more existing functionalities. For example, one or more first commands entered via a switch (e.g., an existing mirror tilt switch on the driver-side) may cause the first electronic control module and/or the second electronic control module to disable tilt functionality (e.g., momentarily) and/or cause the switch to perform other operations such as extension, retraction, folding and/or unfolding operations for one or more vehicle mirrors (e.g., driver-side mirror and/or passenger-side mirror). After a time duration (e.g., expiration of a timer), and/or after one or more second commands are entered via the switch (e.g., an existing mirror tilt switch on the driver-side), the first electronic control module and/or the second electronic control module may resume tilt functionality and/or end control of other operations (e.g., extension, retraction, folding and/or unfolding operations), for example, at least until the one or more first commands are entered again. As described herein, a vehicle may be improved with functionality of extension, retraction, folding, and/or unfolding of one or more side-view mirrors using a switch (e.g., an existing mirror tilt switch) that may also control mirror tilt functionality, including, for example, without visible changes to the vehicle and/or without changes in switch(es)/control(s)/hardware for vehicle door operation (e.g., mirror and/or window controls).

These features, along with many others, are described in greater detail below.

BRIEF DESCRIPTION OF THE DRAWINGS

The present disclosure is shown by way of example figures, listed below, in which like reference numerals indicate similar elements.

FIGS. 1A, 1B, 1C, and 1D show an example side-view mirror assembly in a folded and retracted position.

FIGS. 2A, 2B, 2C, and 2D show an example side-view mirror assembly in an unfolded and retracted position.

FIGS. 3A, 3B, 3C, and 3D show an example side-view mirror assembly in an unfolded and extended position.

FIGS. 4A, 4B, 4C, and 4D show an example side-view mirror assembly in a folded and extended position.

DETAILED DESCRIPTION

Figure 5B:
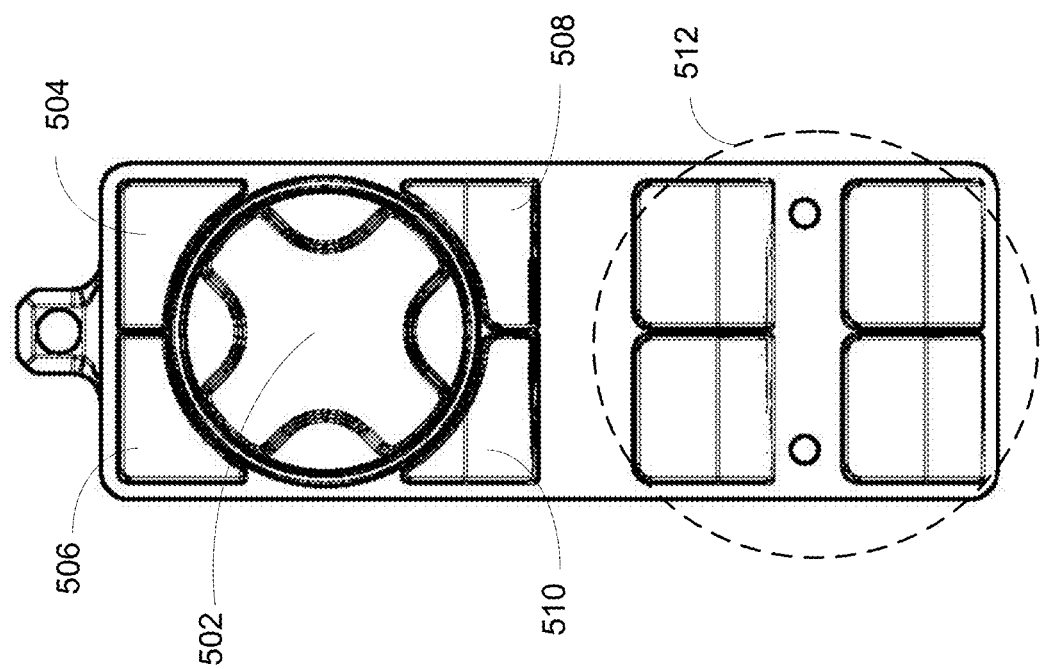
FIGS. 5A and 5B show an isometric view and a top view, respectively, of a control panel for controlling a positioning of a side-view mirror.

In the following detailed description, reference is made to the accompanying drawings, which form a part hereof, and in which is shown, by way of example, various embodiments in which aspects of the disclosure may be implemented. It is to be understood that other embodiments may be used, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

As described above, in at least some vehicles, it may be advantageous for side-view mirrors to have an extend/retract functionality and/or fold/unfold functionality. Side-view mirrors originally provided by the vehicle manufacturer may not necessarily have one or both these functionalities. Even if a side-view mirror assembly as originally provisioned in the vehicle is equipped with extend/retract functionality and/or fold/unfold functionality, the functionalities may only be manual (e.g., requiring a user to manually fold/unfold and/or extend/retract the side-view mirrors).

While aftermarket mirror assemblies with electronically controllable fold/unfold (e.g., power fold) functionality and/or extend/retract (e.g., power extend) functionality may be available, electronic controls and switch layouts in a vehicle may not be compatible with such mirror assemblies. For example, an original mirror assembly provided in the vehicle may only have a mirror tilt functionality (e.g., to tilt the mirror along one or more axes, such as left, right, up, and/or down) that is controllable via a mirror tilt switch located in the vehicle cabin. As a result, an aftermarket mirror assembly, with a power fold functionality and/or a power extend functionality, may require one or more additional components (e.g., a wired controller, a wireless controller, a switch, and/or any other hardware and/or software element) that is/are configured to cause folding/unfolding and/or extension/retraction of the mirror. Using an additional controller may be inconvenient for a user, and the requirement of using a vehicle switch (for controlling the mirror tilt) along with the additional controller (for controlling the fold/unfold functionality and the extend/retract functionality) may be cumbersome, may require visible modification of a vehicle, and/or may impose challenges for installation and/or use.

Various example methods, devices, and systems described herein may enable a more streamlined and seamless integration of vehicle side-view mirror assemblies (e.g., with power fold, power extend, and/or mirror tilt functionalities) with stock mirror controls (e.g., a mirror tilt switch) available/installed in a vehicle. In an example arrangement, a mirror controller may be interfaced with (e.g., spliced between) the vehicle mirror assembly and the mirror tilt switch. The mirror controller may, based on receiving an input from the mirror tilt switch (e.g., a sequence of commands), activate a power fold functionality and/or a power extend functionality (and/or deactivate a mirror tilt functionality). When and/or after the power fold functionality and/or a power extend functionality is activated, the mirror tilt switch may be used to fold, unfold, extend, and/or retract the mirrors. The mirror controller may, based on receiving another input from the mirror tilt switch, deactivate the power fold functionality and/or the power extend functionality (and re-activate the mirror tilt functionality). When the power fold functionality and/or a power extend functionality is deactivated (and mirror tilt functionality is activated), the mirror tilt switch may be used to control the tilt of the mirror. In this manner, the mirror tilt switch may be used to activate/deactivate the power fold functionality and/or the power extend functionality; fold, unfold, extend, and/or retract the mirrors; and/or control the mirror tilt. As such, an additional controller (e.g., a wireless remote control, a wired secondary switch, etc.) is not required to input commands for folding, unfolding, extending, and/or retracting the mirrors. Further, the mirror controller may be seamlessly integrated into the vehicle and powered by the vehicle's built-in power supply (e.g., standard vehicle battery), and not require a separate power supply (e.g., one or more batteries) that may need to be frequently replaced.

FIGS. 1A-1D show an example side-view mirror assembly in a folded and retracted position. FIG. 1A shows a top view, FIG. 1B shows a front view, and FIGS. 1C and 1D show isometric views of the side-view mirror assembly 100 in a folded and retracted position. The side-view mirror assembly 100 may comprise an anchor 130, and extendable arm 110, and a mirror 120. The anchor 130 may attached to the side of a vehicle. The extendable arm 110 may be configured to be rotatable around a hinge attached to the anchor 130, enabling the side-view mirror to unfold and fold.

FIGS. 2A, 2B, 2C, and 2D show an example side-view mirror assembly in an unfolded and retracted position. FIG. 2A shows a top view, FIG. 2B shows a front view, and FIGS. 2C and 2D show isometric views of the side-view mirror assembly in an unfolded position.

FIGS. 3A, 3B, 3C, and 3D show an example side-view mirror assembly in an unfolded and extended position. FIG. 3A shows a top view, FIG. 3B shows a front view, and FIGS. 3C and 3D show isometric views of the side-view mirror assembly in an unfolded position and extended position. In an example arrangement, the side-view mirror assembly 100

(e.g., the extendable arm 110 of the side-view mirror assembly 100) may comprise a railing 140 along which the mirror 120 may slide to enable extension and retraction. The extension may be laterally outwards from the side of the vehicle when the side-view mirror assembly is in an unfolded position. The extension may be maintained even if the side-view mirror is in a folded position.

FIGS. 4A, 4B, 4C, and 4D show an example side-view mirror assembly in a folded and extended position. FIG. 4A shows a top view, FIG. 4B shows a front view, and FIGS. 4C and 4D show isometric views of the side-view mirror assembly in a folded position and extended position.

For any of the mirrors described herein, a positioning of the side-view mirror may be electronically controllable. For example, the side-view mirror assembly may comprise one or more actuators (e.g., motors, or any other type of actuators) that may receive signals input via the electronic switches and, responsive to the input, control a side-view mirror positioning (e.g., folding, unfolding, extension, retraction, and/or tilt of the side-view mirror).

Figure 5A:
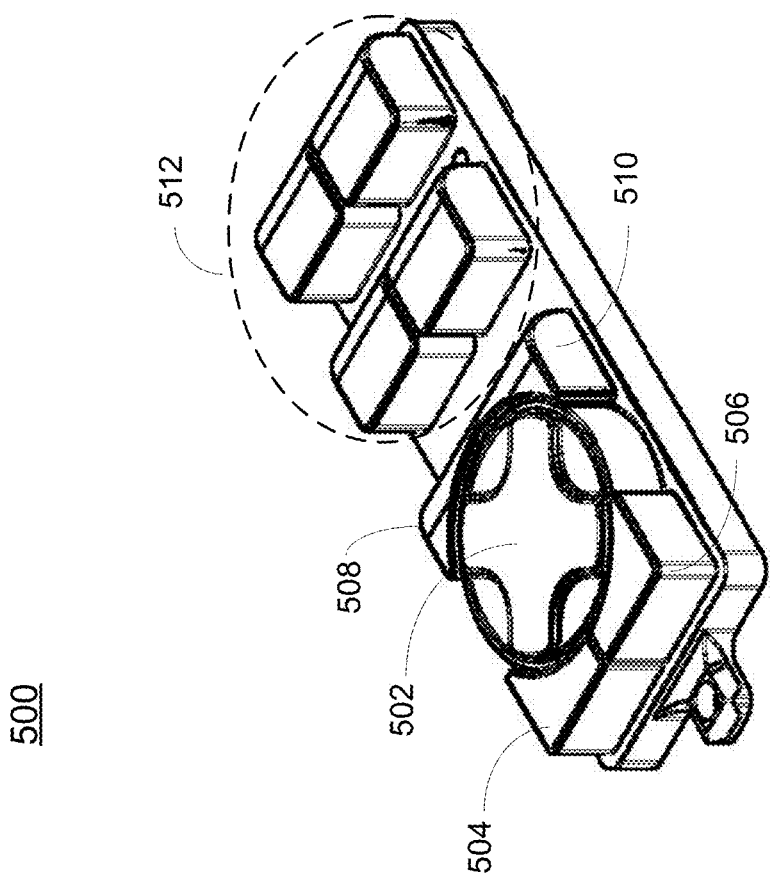

FIGS. 5A and 5B show an isometric view and a top view, respectively, of a control panel for controlling a positioning of a side-view mirror. The control panel 500 may correspond to a vehicle that is factory-equipped with side-view mirrors that have power extend, power fold, and mirror tilt functionalities. In an example arrangement, the control panel 500 may be located on the driver-side of the vehicle cabin. Additionally or alternatively, the control panel 500 may be located on the passenger-side of the vehicle cabin. The control panel may comprise a plurality of switches (e.g., push-button switches) for controlling one or more functions. Switches 506 and 504 may be mirror select switches for selecting one of a driver-side side-view mirror and a passenger side side-view mirror, respectively. Switch 502 may be a mirror tilt switch used to control a mirror tilt of a selected side-view mirror. Switch 502 may comprise up, down, left, and right switches. The up and down switches may control a mirror tilt, of the selected side-view mirror, along a horizontal axis. The left and right switches may control a mirror tilt, of the selected side-view mirror, along a vertical axis. For example, to control a mirror tilt of a driver side side-view mirror, a user may press the switch 506, followed by the left, right, up, and/or down switches. Switch 508 may be used to control extension and retraction (e.g., a power extend functionality) of the selected side-view mirror. Switch 510 may be used to control folding and unfolding (e.g., power fold functionality) of the selected side-view mirror. For example, to unfold and extend a passenger side side-view mirror, a user may press the switch 504, followed by the switch 508, followed by the switch 510. Switches 512 may be used to control power windows (e.g., raising and lowering of the windows) at the doors of the vehicle.

Some vehicles may not be factory equipped with side-view mirrors with power fold and power extend functionalities. In these vehicles, a control panel may only be used to control a mirror tilt of the side-view mirrors.

Figure 6B:
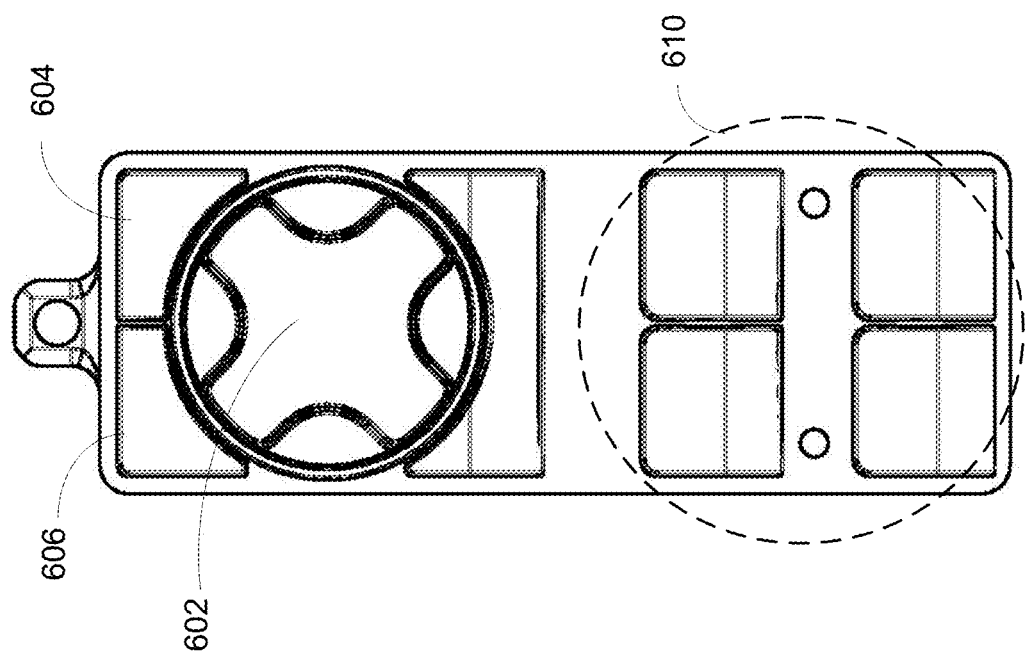
FIGS. 6A and 6B show an isometric view and a top view, respectively, of a control panel for controlling a positioning of a side-view mirror.
Figure 6A:
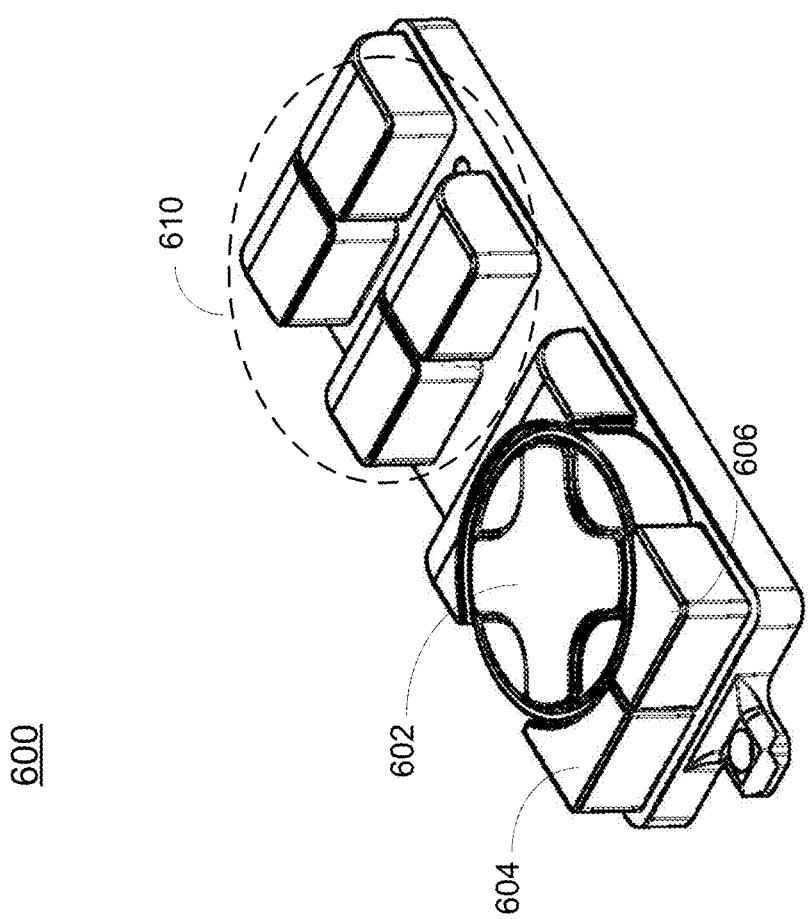

FIGS. 6A and 6B show an isometric view and a top view, respectively, of a control panel for controlling a positioning of a side-view mirror. The control panel 600 may correspond to a vehicle that is factory-equipped with side-view mirrors that only have a mirror tilt functionality. In an example arrangement, the control panel 600 may be located on the driver-side of the vehicle cabin. Additionally or alternatively, the control panel 600 may be located on the passenger-side of the vehicle cabin. The control panel may comprise a plurality of switches (e.g., push-button switches) for controlling one or more functions. Switches 606 and 604 may be mirror select switches for selecting one of a driver-side side-view mirror and a passenger side side-view mirror, respectively. Switch 602 may be a mirror tilt switch used to control a mirror tilt of a selected side-view mirror. Switch 602 may comprise up, down, left, and right switches. The up and down switches may control a mirror tilt, of the selected side-view mirror, along a horizontal axis. The left and right switches may control a mirror tilt, of the selected side-view mirror, along a vertical axis. Functionalities of the switches 602, 604, and 606 may be similar to functionalities of switches 502, 504, and 506, respectively. Switches 610 may be used to control power windows (e.g., raising and lowering of the windows) at the doors of the vehicle.

Example methods, devices, and systems described herein may enable controlling a positioning of a side-view mirror. The controlling a positioning of the side-view mirror may comprise one or more of power extend, power fold, and/or mirror tilt functionalities. The controlling a positioning may comprise using a control panel that is equipped with only a mirror tilt switch (e.g., the control panel 600). As further described herein, a side-view mirror that only has a mirror tilt functionality may be replaced with a side-view mirror having power extend, power fold, and mirror tilt functionalities. A mirror controller may be coupled between the mirror tilt switch and the side-view mirror to enable the mirror tilt switch to additionally control the power extend and power fold functionality of the side-view mirror, as described herein.

Respective mirror controllers may be used for a driver-side side-view mirror and a passenger-side side-view mirror. The mirror tilt switch may be used to send signals to one or both of the mirror controllers in order to control the positioning of the side-view mirrors. For brevity, driver-side side-view mirror may be referred herein as left-hand side (LH) mirror and passenger-side side-view mirror may be referred herein as right-hand side (RH) mirror. Further, a mirror controller for controlling a positioning of the driver-side side-view mirror may be referred herein as an LH mirror controller and a mirror controller for controlling a positioning of the passenger-side side-view mirror may be referred herein as an RH mirror controller. The methods, devices, and systems described herein, however, are equally applicable in scenarios where the driver-side side-view mirror is an RH mirror and the passenger-side side-view mirror is an LH mirror (e.g., in countries with left-hand traffic). In such scenarios, the functionalities/configuration of the LH mirror controller described herein are applicable to an RH mirror controller of the RH mirror and the functionalities/configuration of the RH mirror controller described herein are applicable to an LH mirror controller of the LH mirror.

Figure 7A:
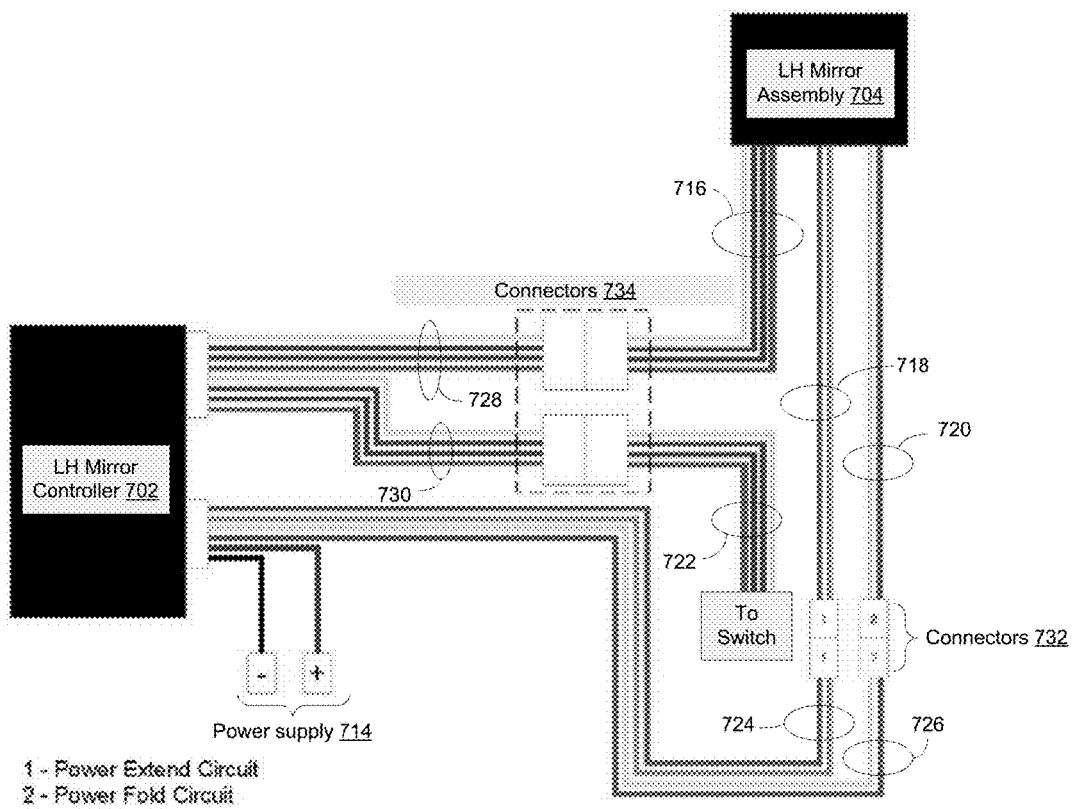
FIG. 7A shows an example wiring diagram for interfacing a mirror controller with a mirror tilt switch for controlling a positioning of a driver-side side-view mirror.

FIG. 7A shows an example wiring diagram 700 for interfacing a mirror controller with a mirror tilt switch for controlling a positioning of a driver-side side-view mirror (e.g., LH mirror). The LH mirror may have power extend, power fold, and mirror tilt functionalities. For example, the LH mirror may be associated with an LH mirror assembly 704. The LH mirror assembly may comprise one or more actuators (e.g., motors) for controlling extension, retraction, folding, unfolding, and/or tilt of the LH mirror.

One or more wires 722 from a mirror tilt switch (e.g., the mirror tilt switch 602) may be connected (e.g., electrically coupled) to an input of an LH mirror controller 702 (e.g., one or more wires 730). A first output of the LH mirror controller 702 (e.g., one or more wires 728) may be connected (e.g., electrically coupled) to a first input of the LH mirror assembly 704 (e.g., one or more wires 716). The one or more wires 716 may be for controlling a mirror tilt functionality of the LH mirror and may be connected (e.g., electrically coupled) to one or more actuators configured to cause the LH mirror tilt. Connections between the mirror tilt switch, the input to the LH mirror controller 702, the first output of the LH mirror controller 702, and the first input of the LH mirror assembly 704 may be made using connectors 734. Use of one or more connectors 734 may enable simplified replacement of the LH mirror assembly 704, LH mirror controller 702, and/or the switch coupled to wires 722, for example, without modification of wiring. Additionally or alternatively, at least some of wires 728 and/or 730 may be connected (e.g., electrically coupled) to at least some of wires 716 and/or 722 without the one or more connectors 734 (e.g., via wire splicing, soldering wires, electrical taping of wires, new wiring, etc.).

A second output of the LH mirror controller 702 (e.g., one or more wires 724) may be connected (e.g., electrically coupled) to a second input of the LH mirror assembly 704 (e.g., one or more wires 718). The one or more wires 718 may be for controlling a power extend functionality of the LH mirror and may be connected (e.g., electrically coupled) to one or more actuators configured to cause the LH mirror extension and/or retraction. A third output of the LH mirror controller 702 (e.g., one or more wires 726) may be connected (e.g., electrically coupled) to a third input of the LH mirror assembly 704 (e.g., one or more wires 720). The one or more wires 720 may be for controlling a power fold functionality of the LH mirror and may be connected (e.g., electrically coupled) to one or more actuators configured to cause the LH mirror folding and/or unfolding. Connections between the second output of the LH mirror controller 702, the third output of the LH mirror controller 702, the second input of the LH mirror assembly 704, and/or the third input of the LH mirror assembly 704 may be made via one or more connectors 732. Use of one or more connectors 732 may enable simplified replacement of the LH mirror assembly 704 and/or the LH mirror controller 702, for example, without modification of wiring. Additionally or alternatively, at least some of wires 718 and/or 720 may be connected (e.g., electrically coupled) to at least some of wires 724 and/or 726 without the one or more connectors 732 (e.g., via wire splicing, soldering wires, electrical taping of wires, new wiring, etc.). The LH mirror controller 702 may be powered by a power supply 714. The power supply 714 may comprise a vehicle battery (e.g., which may power other operations of the vehicle).

Figure 7B:
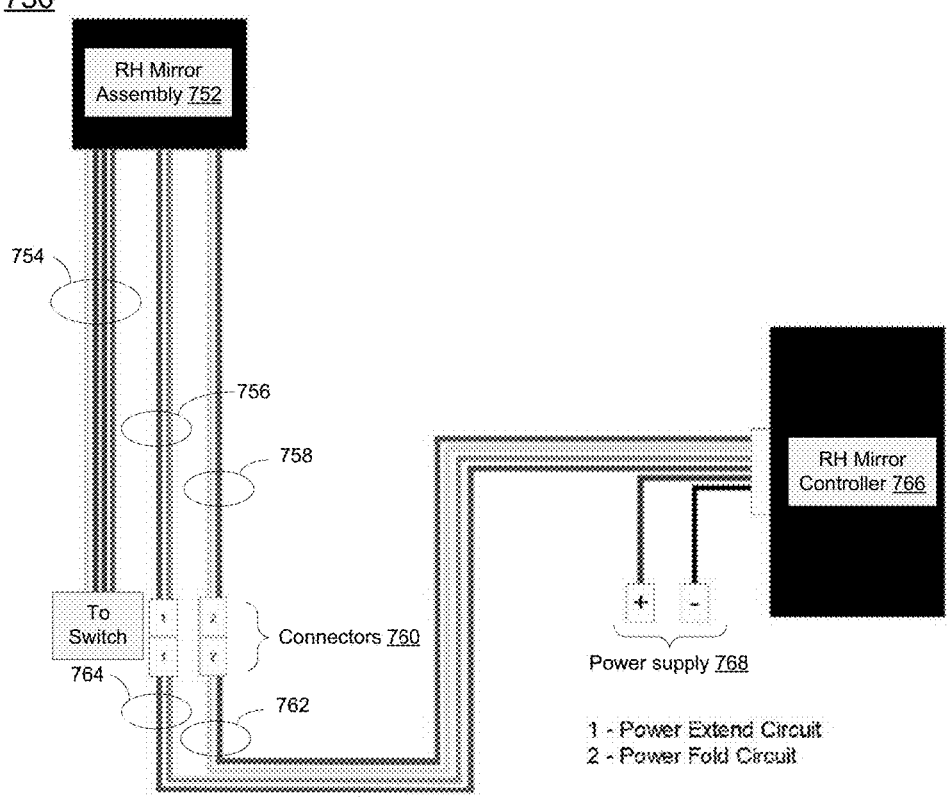
FIG. 7B shows an example wiring diagram for interfacing a mirror controller with a mirror tilt switch for controlling a positioning of a passenger-side side-view mirror.

FIG. 7B shows an example wiring diagram 750 for interfacing a mirror controller with a mirror tilt switch for controlling a positioning of a passenger-side side-view mirror (e.g., RH mirror). The RH mirror may have power extend, power fold, and mirror tilt functionalities. For example, the RH mirror may be associated with an RH mirror assembly 752, with the RH mirror assembly comprising one or more actuators (e.g., motors) for controlling extension, retraction, folding, unfolding, and/or tilt of the RH mirror.

One or more wires 754 from a mirror tilt switch (e.g., the mirror tilt switch 602) may be connected (e.g., electrically coupled) to a first input of the RH mirror assembly 752 (e.g., one or more wires 754). Additionally or alternatively, the one or more wires 754 may be connected (e.g., electrically coupled) to a dedicated control module (e.g., within a vehicle door) that may interface with a mirror tilt switch (e.g., the mirror tilt switch 602), such as via a controller area network bus (CAN-Bus) and/or any other communication protocol. The one or more wires 754 may be for controlling a mirror tilt functionality of the RH mirror and may be connected (e.g., electrically coupled) to one or more actuators configured to cause the RH mirror tilt.

A first output of the RH mirror controller 766 (e.g., one or more wires 764) may be connected (e.g., electrically coupled) to a second input of the RH mirror assembly 752 (e.g., one or more wires 756). The one or more wires 756 may be for controlling a power extend functionality of the RH mirror and may be connected (e.g., electrically coupled) to one or more actuators configured to cause the RH mirror extension and/or retraction. A second output of the RH mirror controller 766 (e.g., one or more wires 762) may be connected (e.g., electrically coupled) to a third input of the RH mirror assembly 752 (e.g., one or more wires 758). The one or more wires 758 may be for controlling a power fold functionality of the RH mirror and may be connected (e.g., electrically coupled) to one or more actuators configured to cause the RH mirror folding and/or unfolding. Connections between the first output of the RH mirror controller 766, the second output of the RH mirror controller 766, the second input of the RH mirror assembly 752, and/or the third input of the RH mirror assembly 752 may be made via one or more connectors 760. Use of one or more connectors 760 may enable simplified replacement of the RH mirror assembly 752, RH mirror controller 766, and/or switch 764, for example, without modification of wiring. Additionally or alternatively, at least some of wires 756 and/or 758 may be connected (e.g., electrically coupled) to at least some of wires 764 and/or 762 without the one or more connectors 760 (e.g., via wire splicing, soldering wires, electrical taping of wires, new wiring, etc.). The RH mirror controller 766 may be powered by a power supply 768. The power supply 768 may comprise a vehicle battery (e.g., which may power other operations of the vehicle). The power supply 768 and the power supply 714 may comprise the same power supply.

Figure 8A:
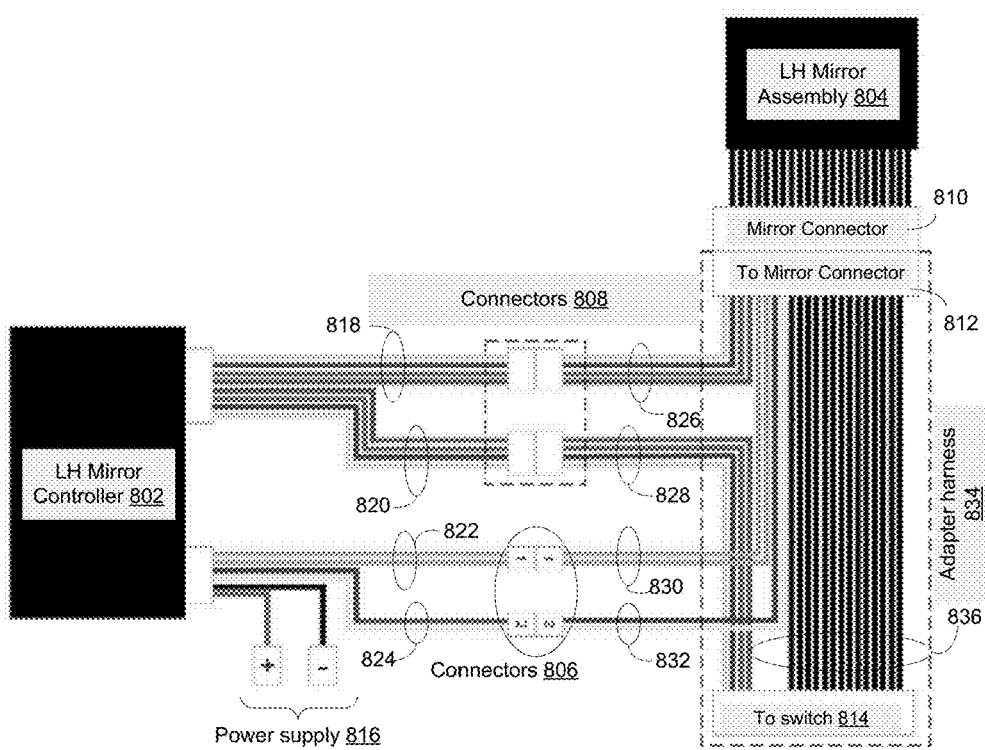
FIG. 8A shows an example wiring diagram for interfacing a mirror controller with a mirror tilt switch for controlling a positioning of a driver-side side-view mirror.

FIG. 8A shows an example wiring diagram 800 for interfacing a mirror controller with a mirror tilt switch for controlling a positioning of a driver-side side-view mirror (e.g., LH mirror). The LH mirror may have power extend, power fold, and mirror tilt functionalities. For example, the LH mirror may be associated with an LH mirror assembly 804. The LH mirror assembly 804 may comprise one or more actuators (e.g., motors) for controlling extension, retraction, folding, unfolding, and/or tilt of the LH mirror. The LH mirror assembly 804 may, in addition to providing power extend, power fold, and mirror tilt functionalities for the LH mirror, may additionally provide one or more other functions (e.g., mirror defrost, blind spot indicator, turn indicator, etc.).

Signals for controlling the extension, retraction, folding, unfolding, tilt, and/or the one or more other functions may be indicated via an adapter harness 834. The adapter hardness 834 may comprise any type and/or quantity of wires, each of which may be physically joined or separated with one or more other wires. In an arrangement, a control panel may have, in addition to a mirror tilt switch, one or more additional buttons to control the one or more other functions (e.g., window control(s), mirror defrost, blind spot indicator, turn indicator, etc.). A first connector 814 of the adapter harness 834 may be connected (e.g., electrically coupled) to the control panel. The second connector 812 may be connected (e.g., electrically coupled) to a mirror connector 810. Wires associated with mirror connector 810 may be connected (e.g., electrically coupled) to the LH mirror assembly 804.

One or more wires 828 of the adapter harness 834 may be connected (e.g., electrically coupled) to an input of an LH mirror controller 802 (e.g., one or more wires 820). The one or more wires 828 may communicate signals that are input via the mirror tilt switch. A first output of the LH mirror controller 802 (e.g., one or more wires 818) may be connected (e.g., electrically coupled) to one or more wires 826 of the adapter harness 834 (e.g., a first input of the LH mirror assembly 804). The one or more wires 826 may be for controlling a mirror tilt functionality of the LH mirror and may be connected (e.g., via the mirror connector 810) to one or more actuators configured to cause the LH mirror tilt. Connections between the one or more wires 828, the input to the LH mirror controller 802, the first output of the LH mirror controller 802, and/or the one or more wires 826 may be made using connectors 808. Use of one or more connectors 808 may enable simplified replacement of the LH mirror assembly 804, LH mirror controller 802, adapter hardness 834, and/or switch 814, for example, without modification of wiring. Additionally or alternatively, at least some of wires 818 and/or 820 may be connected (e.g., electrically coupled) to at least some of wires 826 and/or 828 without the one or more connectors 808 (e.g., via wire splicing, soldering wires, electrical taping of wires, new wiring, etc.).

One or more wires 836 of the adapter harness 836 may be for controlling the one or more other functions (e.g., mirror defrost, blind spot indicator, turn indicator, etc.) associated with the LH mirror assembly 804. The one or more wires 836 may communicate signals that are input via the one or more additional buttons of the control panel.

A second output of the LH mirror controller 802 (e.g., one or more wires 822) may be connected (e.g., electrically coupled) to one or more wires 830 of the adapter harness 834 (e.g., a second input of the LH mirror assembly 804). The one or more wires 830 may be for controlling a power extend functionality of the LH mirror and may be connected (e.g., via the mirror connector 810) to one or more actuators configured to cause the LH mirror extension and/or retraction. A third output of the LH mirror controller 802 (e.g., one or more wires 824) may be connected (e.g., electrically coupled) to one or more wires 832 of the adapter harness (e.g., a third input of the LH mirror assembly 804). The one or more wires 832 may be for controlling a power fold functionality of the LH mirror and may be connected (e.g., electrically coupled) to one or more actuators configured to cause the LH mirror folding and/or unfolding. Connections between the second output of the LH mirror controller 802, the third output of the LH mirror controller 802, the one or more wires 830, and/or the one or more wires 832 may be made via one or more connectors 806. Use of one or more connectors 806 may enable simplified replacement of the LH mirror assembly 804, LH mirror controller 802, adapter harness 802, and/or switch 814, for example, without modification of wiring. Additionally or alternatively, at least some of wires 822 and/or 824 may be connected (e.g., electrically coupled) to at least some of wires 830 and/or 832 without the one or more connectors 806 (e.g., via wire splicing, soldering wires, electrical taping of wires, new wiring, etc.). The LH mirror controller 802 may be powered by a power supply 816. The power supply 816 may comprise a vehicle battery (e.g., which may power other operations of the vehicle).

Figure 8B:
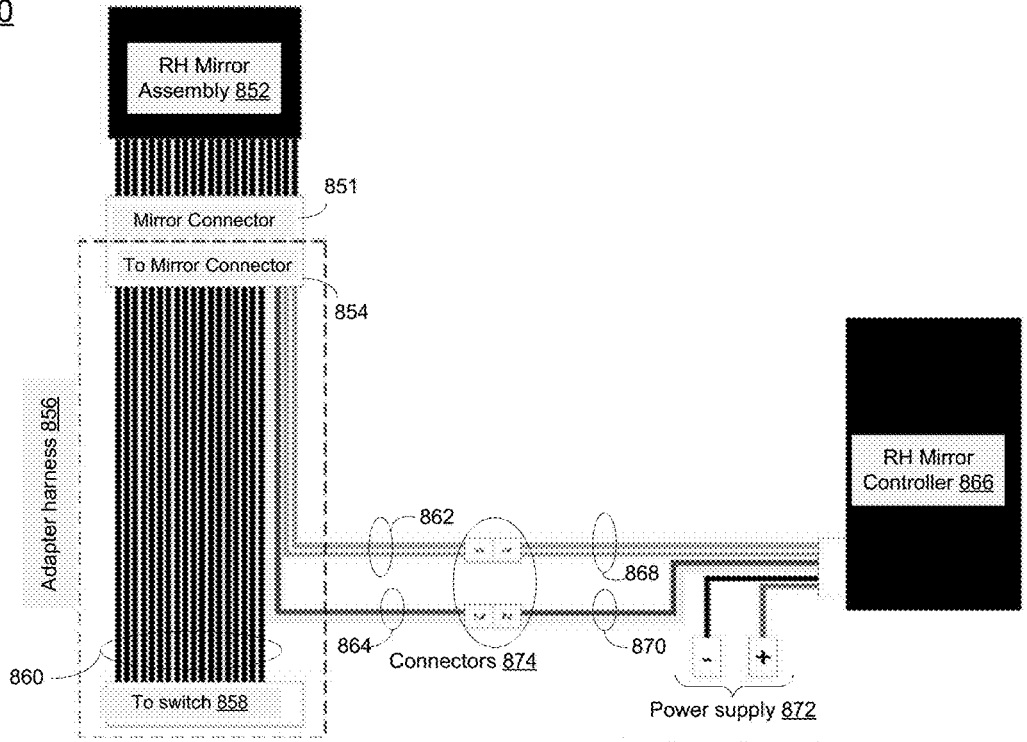
FIG. 8B shows an example wiring diagram for interfacing a mirror controller with a mirror tilt switch for controlling a positioning of a passenger-side side-view mirror.

FIG. 8B shows an example wiring diagram 850 for interfacing a mirror controller with a mirror tilt switch for controlling a positioning of a passenger-side side-view mirror (e.g., RH mirror). The RH mirror may have power extend, power fold, and mirror tilt functionalities. For example, the RH mirror may be associated with an RH mirror assembly 852, with the RH mirror assembly comprising one or more actuators (e.g., motors) for controlling extension, retraction, folding, unfolding, and/or tilt of the RH mirror.

Control of the extension, retraction, folding, unfolding, tilt, and/or the one or more other functions may be indicated and/or provided via an adapter harness 856. The adapter harness 856 may comprise any type and/or quantity of wires, each of which may be physically joined or separated with one or more other wires. A first connector 858 of the adapter harness 856 may connected (e.g., electrically coupled) to the control panel. The second connector 854 of the adapter harness 856 may be connected (e.g., electrically coupled) to a mirror connector 851. Wires associated with mirror connector 851 may be connected (e.g., electrically coupled) to the RH mirror assembly 852. At least some of wires 860 of the adapter harness 856 may be for controlling the one or more other functions (e.g., window control, mirror defrost, blind spot indicator, turn indicator, etc.) associated with the RH mirror assembly 852. At least some of the wires 860 may communicate signals that are input via the one or more additional buttons of the control panel. Additionally, one or more of the wires 860 may communicate signals that are input via the mirror tilt switch (e.g., the mirror tilt switch 602) and may be connected (e.g., electrically coupled) to a first input of the RH mirror assembly 852 (e.g., via the mirror connector 851). The one or more of the wires 860 may be for controlling a mirror tilt functionality of the RH mirror and may be connected to one or more actuators configured to cause the RH mirror tilt.

A first output of the RH mirror controller 866 (e.g., one or more wires 868) may be connected (e.g., electrically coupled) to one or more wires 862 of the adapter harness 856 (e.g., a second input of the RH mirror assembly 852). The one or more wires 862 may be for controlling a power extend functionality of the RH mirror and may be connected (e.g., electrically coupled) to one or more actuators configured to cause the RH mirror extension and/or retraction. A second output of the RH mirror controller 866 (e.g., one or more wires 870) may be connected (e.g., electrically coupled) to one or more wires 864 (e.g., a third input of the RH mirror assembly 852). The one or more wires 864 may be for controlling a power fold functionality of the RH mirror and may be connected (e.g., electrically coupled) to one or more actuators configured to cause the RH mirror folding and/or unfolding. Connections between the first output of the RH mirror controller 866, the second output of the RH mirror controller 866, the second input of the RH mirror assembly 852, and the third input of the RH mirror assembly 852 may be made via one or more connectors 874. Use of one or more connectors 874 may enable simplified replacement of the RH mirror assembly 852, RH mirror controller 866, adapter harness 856, and/or switch 858, for example, without modification of wiring. Additionally or alternatively, at least some of wires 862 and/or 864 may be connected (e.g., electrically coupled) to at least some of wires 868 and/or 870 without the one or more connectors 874 (e.g., via wire splicing, soldering wires, electrical taping of wires, new wiring, etc.). The RH mirror controller 866 may be powered by a power supply 872. The power supply 872 may comprise a vehicle battery (e.g., which may power other operations of the vehicle). The power supply 872 and the power supply 816 may comprise the same power supply.

A mirror controller (e.g., the LH mirror controller 702, the LH mirror controller 802) may have one or more of mirror tilt, power extend, and/or power fold functionalities. Additionally or alternatively, a mirror controller (e.g., the LH mirror controller 702, the LH mirror controller 802) operate as a pass-through device for one or more of mirror tilt, power extend, and/or power fold functionalities. For example, the mirror controller may comprise a built-in power extend functionality and may operate as a pass-through device for mirror tilt and/or power fold functionalities. As another example, the mirror controller may comprise built-in power extend and power fold functionalities and may operate as a pass-through device for mirror tilt functionality. Any combination of functionality and/or pass through operation may be implemented in the mirror controller for any quantity/type of functionality. The mirror controller may send signals to a mirror assembly (e.g., the LH mirror assembly 704 via the one or more wires 728, LH mirror assembly 804 via the one or more wires 818) to cause mirror tilt (e.g., of an LH mirror) when the mirror tilt functionality is activated and the power extend and/or power fold functionalities are deactivated. Alternatively, the mirror control may not send signals to a mirror assembly (e.g., the LH mirror assembly 704 via the one or more wires 728, LH mirror assembly 804 via the one or more wires 818) to cause another functionality (e.g., such as a mirror tilt) when the power extend and/or power fold functionalities are deactivated. The mirror controller may send signals to the mirror assembly (e.g., the LH mirror assembly 704 via the wires 724 and/or 726, the LH mirror assembly 804 via the wires 822 and/or 824) to cause extension, retraction, folding and/or unfolding of the mirror when the power extend and/or power fold functionalities are activated, and the mirror tilt functionality is deactivated. As further described herein, a mirror tilt functionality of the mirror controller may be deactivated, and a power extend and/or power fold functionality of the mirror controller may be activated (or vice-versa), for example, based on a sequence of commands from the mirror tilt switch.

The mirror controller (e.g., the LH mirror controller 702, the LH mirror controller 802) may also communicate (e.g., wirelessly and/or via one or more wires) with a second mirror controller (e.g., the RH mirror controller 766, the RH mirror controller 866) to enable extension, retraction, folding and/or unfolding of a second mirror (e.g., an RH mirror). Communication between the mirror controller (e.g., the LH mirror controller 702, the LH mirror controller 802) and the second mirror controller (e.g., the RH mirror controller 766, the RH mirror controller 866) may be via any frequency (e.g., 2.4 GHz spectrum, 5 GHz spectrum, and/or any other frequency spectrum) and/or may use any communication protocol (e.g., Bluetooth, Wi-Fi, USB, UART, SPI, I2C, LIN, CAN, Flex-Ray, Ethernet, UDS, 4G LTE, 5G NR, and/or 6G). Additionally or alternatively, a mirror controller (e.g., the LH mirror controller 702, the LH mirror controller 802) may communicate with one or more components (e.g., via one or more wires) to control a plurality of vehicle mirrors. For example, a mirror controller (e.g., the LH mirror controller 702, the LH mirror controller 802) may be configured to communicate with (and/or control) both a first mirror (e.g., on a driver-side) of a vehicle and a second mirror (e.g., on a passenger side, a rearview mirror, etc.) of the vehicle. Additionally or alternatively, the mirror controller may be configured to communicate with (and/or control) the first mirror and the second mirror (and/or another mirror of the vehicle) via one or more wired connections between the first mirror and the mirror controller and/or between the second (or other) mirror(s) and the mirror controller. The mirror controller may send signals to the second mirror controller when the power extend and/or power fold functionalities are activated, and the mirror tilt functionality is deactivated. Based on receiving the signals, the second mirror controller may send signals to a second mirror assembly (e.g., the RH mirror assembly 752 via the wires 762 and/or 764, the RH mirror assembly 852 via the wires 868 and/or 870) to cause extension, retraction, folding and/or unfolding of the second mirror.

Figure 9:
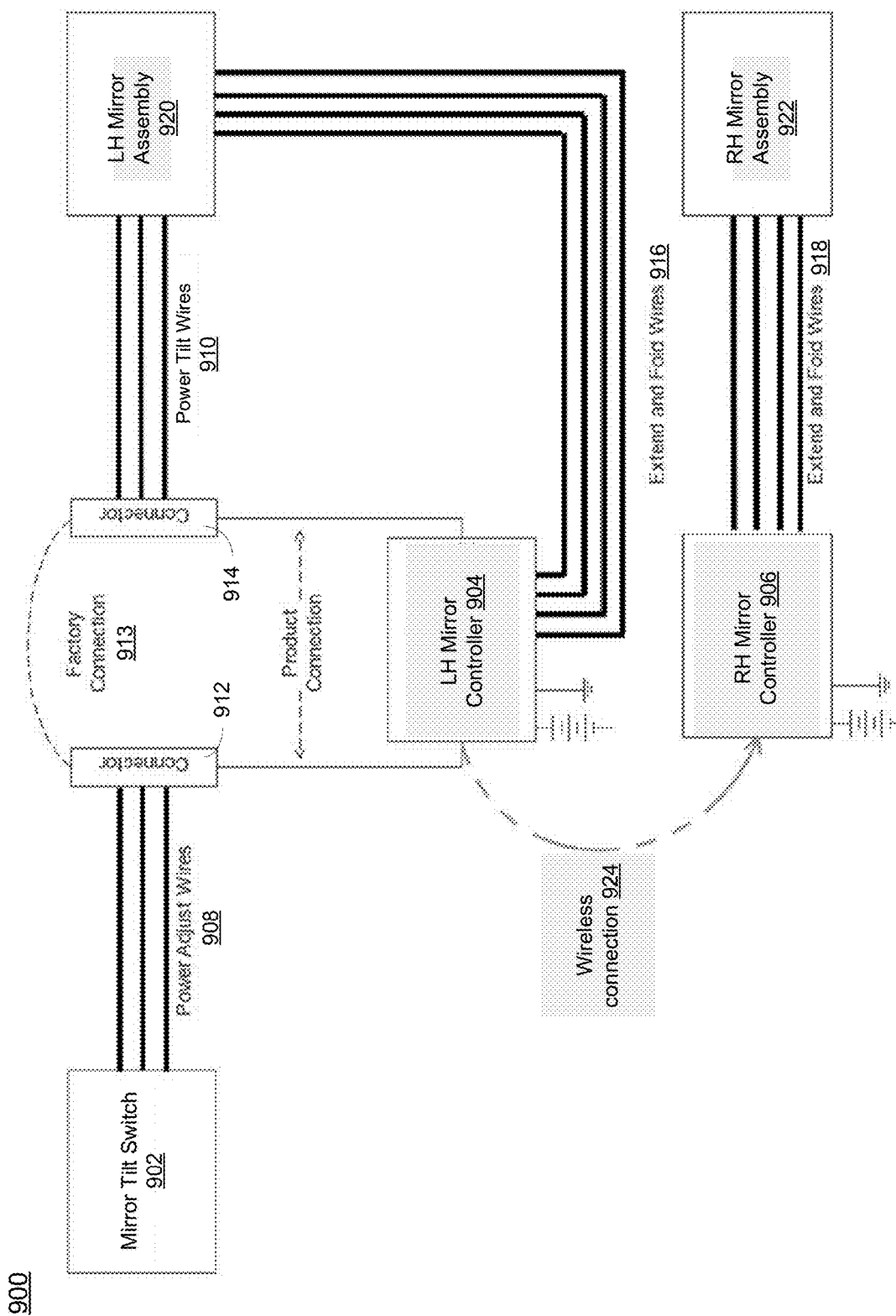
FIG. 9 shows an example architecture for controlling positioning of a driver-side side-view mirror and a passenger-side side-view mirror via a mirror tilt switch and associated mirror controllers.

FIG. 9 shows an example architecture 900 for controlling positioning of a driver-side side-view mirror and a passenger-side side-view mirror via a mirror tilt switch and associated mirror controllers. The driver-side side-view mirror may be an LH mirror and the passenger-side side-view mirror may be an RH mirror. The architecture 900 may correspond to the wiring diagrams shows in FIGS. 7A and 7B, and/or FIGS. 8A and 8B.

A factory connection 913 from a mirror tilt switch to an LH mirror assembly may be intercepted such that an LH mirror controller 906 may receive input from the mirror tilt switch 902. Output from the LH mirror controller 904 may be provided to one or more actuators of an LH mirror assembly 920 (e.g., with power fold, power extend, and mirror tilt functionalities). For example, connectors 912 and 914 may be used to splice the LH mirror controller 904 to power adjust wires 908 and power tilt wires 910 associated with the mirror tilt switch 902 and the LH mirror assembly 908. The power tilt wires 910 may provide an output from the LH mirror controller 904 to the LH mirror assembly 920. The power tilt wires 910 may be for controlling a mirror tilt functionality of the LH mirror and may be connected to one or more actuators configured to cause the LH mirror tilt.

Extend and fold wires 916 may provide outputs from the LH mirror controller 904 to the LH mirror assembly 920. The extend and fold wires 916 may be for controlling a power extend and/or power fold functionality of the LH mirror. The extend and fold wires 916 may be connected to one or more actuators, of the LH mirror assembly 920, configured to cause extension, retraction, folding and/or unfolding of the LH mirror.

The LH mirror controller 904 may send signals to the LH mirror assembly 920, via the power tilt wires 910, to cause mirror tilt of the LH when the mirror tilt functionality is activated, and the power extend and/or power fold functionalities are deactivated. The LH mirror controller 904 may send signals to the LH mirror assembly 920, via the extend and fold wires 916, to cause extension, retraction, folding and/or unfolding of the LH mirror when the power extend and/or power fold functionalities are activated, and the mirror tilt functionality is deactivated. The mirror tilt functionality may be deactivated, and a power extend and/or power fold functionality may be activated based on a sequence of commands from the mirror tilt switch 902.

The LH mirror controller 904 may wirelessly connect to an RH mirror controller 906, for example, via a wireless connection 924 (e.g., a radio frequency communication). For example, the LH mirror controller 904 may send one or more commands and/or communications to the RH mirror controller 906 via the wireless connection 924. Additionally or alternatively, the RH mirror controller 906 may send one or more communications to the LH mirror controller 904 via the wireless connection 924 (e.g., feedback signal(s), acknowledgement(s), and/or other communications). Output from the RH mirror controller 906 may be provided, via extend and fold wires 918, to one or more actuators of an RH mirror assembly 922 (e.g., with power fold, power extend, and mirror tilt functionalities). The extend and fold wires 922 may be for controlling a power extend and/or power fold functionality of the RH mirror and may be connected to one or more actuators, of the RH mirror assembly 922, configured to cause extension, retraction, folding and/or unfolding of the RH mirror.

The LH mirror controller 904 may send signals to the RH mirror controller 906 when (and/or after) the power extend and/or power fold functionalities are activated, and the mirror tilt functionality is deactivated. Based on receiving the signals, the RH mirror controller 906 may send signals to the RH mirror assembly 922, via the extend and fold wires 918, to cause extension, retraction, folding and/or unfolding of the RH mirror.

Figure 10A:
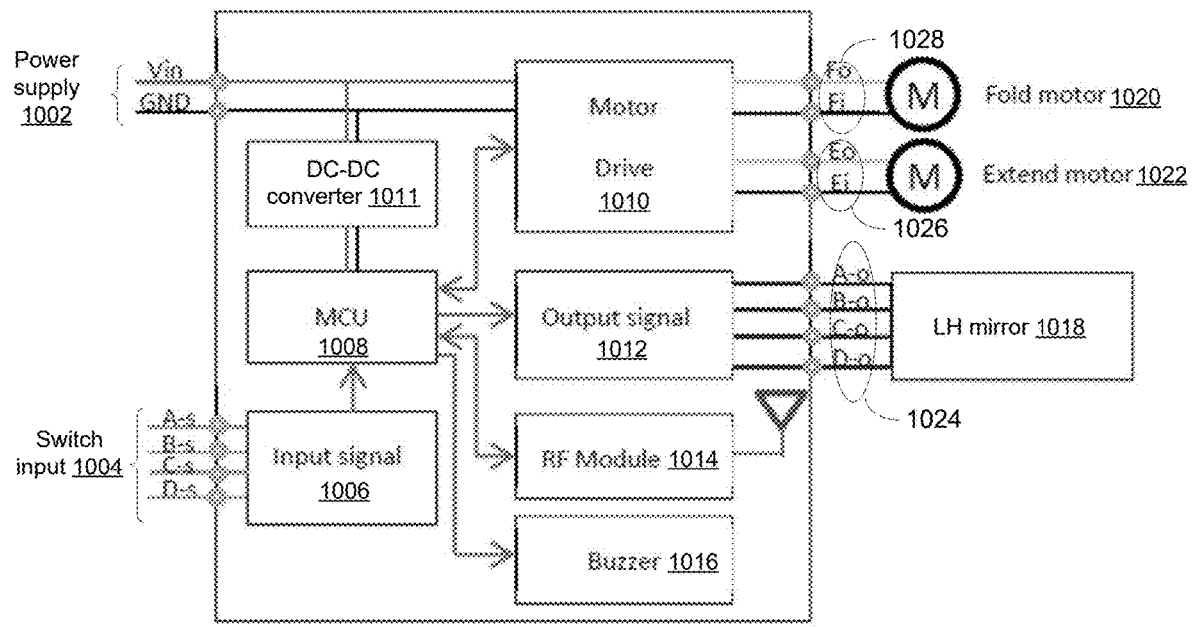
FIG. 10A shows an example architecture of a driver-side side-view mirror controller.

FIG. 10A shows an example architecture of a driver-side side-view mirror (e.g., LH mirror) controller. The LH mirror controller 1000 may receive an input signal 1006 (e.g., switch input 1004 from a mirror tilt switch). The input signal 1006 may comprise input(s) received from one or more switches of a mirror tilt switch (e.g., left, right, up, down switches of the mirror tilt switch) on a control panel. For example, the input signal 1006 may correspond to signals received via wires 722 (such as shown in FIG. 7A) and/or via wires 828 (such as shown in FIG. 8A).

A microcontroller unit (MCU) 1008 may process the input signal 1006. Based on processing the input signal 1006, the MCU may control a motor drive 1010 and/or send an output signal 1012 to control a tilt of the LH mirror 1018. The motor drive 1010 may control, using a fold motor 1020, folding and/or unfolding of the LH mirror 1018. The motor drive 1010 may control, using an extend motor 1022, extension and/or retraction of the LH mirror 1018. The LH mirror controller 1000 may be powered using a power supply 1002. A direct current (DC)-DC converter 1011 may convert a voltage of the power supply 1002 to a voltage that is usable by components of the LH mirror controller 1000. The RF module 1014 may be used to send/receive signals to an RH mirror controller.

Processing the input signal, by the MCU 1008, may comprise determining if the input signal 1006 matches a predetermined sequence for disabling a mirror tilt functionality, and/or enabling a power extend and/or power fold functionalities. If the input signal 1006 matches the predetermined sequence, the MCU 1008 may deactivate the mirror tilt functionality, and/or activate the power extend and/or power fold functionalities. If the input signal 1006 does not match the predetermined sequence, the MCU 1008 may not deactivate the mirror tilt functionality, and/or may not activate the power extend and/or power fold functionalities. The predetermined sequence may be, for example, {left, left, right, right} that may be input by consecutively pressing the left switch twice followed by the right switch twice. Any other predetermined sequence (e.g., including any quantity and/or type of command(s)/input(s), such as any combination of left/right/up/down, and/or any combination of duration of command(s)/input(s) such as a press-and-hold of a button for at least 1, 2, 5, or 10 seconds, etc.) may be used for deactivating the mirror tilt functionality, and/or enabling the power extend and/or power fold functionalities.

If the mirror tilt functionality is deactivated, and the power extend and/or power fold functionalities are activated, a subsequent input (e.g., within a time duration, and/or within a time duration after a last input) received from the mirror tilt switch may be used to extend, retract, fold, and/or unfold the LH mirror 1018. The MCU 1008 may send one or more signals, to the motor drive 1010, to cause folding, unfolding, extension, and/or retraction of the LH mirror 1018, for example, if the mirror tilt functionality is deactivated, and the power extend and/or power fold functionalities are activated. If a "down" input is received from the mirror tilt switch, the MCU 1008 may send a signal to the motor drive 1010 to cause unfolding of the LH mirror 1018. If an "up" input is received from the mirror tilt switch, the MCU 1008 may send a signal to the motor drive 1010 to cause folding of the LH mirror 1018. If a "left" input is received from the mirror tilt switch, the MCU 1008 may send a signal to the motor drive to cause extension of the LH mirror 1018. If a "right" input is received from the mirror tilt switch, the MCU 1008 may send a signal to the motor drive to cause retraction of the LH mirror 1018. Any other input may be used to fold, unfold, extend, or retract the LH mirror 1018. The motor drive 1010 may send signal(s) to the fold motor 1020 and/or the power motor 1022, to cause folding, unfolding, extension, and/or retraction of the LH mirror, based on receiving the signals from the MCU 1008.

The motor drive 1010 may be interfaced with the fold motor 1020 via one or more wires 1028, and/or with the extend motor 1022 via one or more wires 1026. The one or more wires 1028 may correspond to the one or more wires 720 (e.g., as described with reference to FIG. 7A) or the one or more wires 832 (e.g., as described with reference to FIG. 8A). The one or more wires 1026 may correspond to the one or more wires 718 (e.g., as described with reference to FIG. 7A) or the one or more wires 830 (e.g., as described with reference to FIG. 8A).

If the mirror tilt functionality is deactivated, and the power extend and/or power fold functionalities are activated, the predetermined sequence may be used to re-activate the mirror tilt functionality and/or to deactivate the power extend and/or power fold functionalities. For example, the MCU 1008, based on receiving the predetermined sequence as the input signal 1006, may re-activate the mirror tilt functionality and/or deactivate the power extend and/or power fold functionalities.

If the mirror tilt functionality is not deactivated and/or is re-activated, an input received from the mirror tilt switch may be used to tilt the LH mirror 1018. The MCU 1008 may send the output signal 1012 (e.g., based on the input signal 1006) to the LH mirror 1018 (e.g., one or more tilt actuators associated with the LH mirror 1018) to cause the LH mirror 1018 to tilt along one or more axes, for example, if the mirror tilt functionality is not deactivated and/or is re-activated. The MCU 1008 may send the output signal 1012 via the one or more wires 1024. The one or more wires 1024 may correspond to the one or more wires 716 (e.g., as described with reference to FIG. 7A) and/or the one or more wires 826 (e.g., as described with reference to FIG. 8A)

The MCU 1008 may delay one or more signals and/or operations (e.g., one or more signals and/or operations described herein). The MCU 1008 may delay one or more signals and/or operations, for example, to prevent and/or reduce a likelihood that an operation of the mirror tilt switch performs an unintended functionality, such as a tilt functionality instead of a power extend functionality and/or a tilt functionality instead of a power fold functionality. Delay by the MCU 1008 of one or more signals and/or operations may cause the mirror tilt switch to perform a power extend functionality and/or a power fold functionality in accordance with user input to the mirror tilt switch, for example, after receiving a predetermined sequence to deactivate the mirror tilt functionality and/or to activate the power extend and/or power fold functionalities. The delay by the MCU 1008 may comprise any duration (e.g., 1, 10, and 100 microseconds; 1, 10, and/or 100 milliseconds; and/or 1, 2, and/or 3 seconds, etc.). The delay by the MCU 1088 may be of a duration that may not be noticeable by a user. The delay by the MCU 1008 may be of a duration that may be noticeable by a user while also sufficiently short in duration so as to be perceived as responsive to a user input. The delay by the MCU 1008 may be fixed or adjustable. The delay by the MCU 1008 may be programmable. The delay by the MCU 1008 may vary, for example, based on one or more sequences that may be entered. The delay by the MCU 1008 may comprise at least a portion of delay associated with operation of one or more components. After the delay by the MCU 1008, the mirror tilt switch may operate without the delay (and/or with a different delay, such as a shorter delay) at least until a functionality is deactivated (e.g., deactivation of power extend functionality and/or deactivation of power fold functionality) and/or another functionality is activated (e.g., activation of power tilt functionality).

The RF module 1014 may be used to communicate with an RH mirror controller (e.g., as further described with reference to FIG. 10B). If the mirror tilt functionality is deactivated, and/or if the power extend and/or power fold functionalities are activated, a subsequent input received from the mirror tilt switch may be used to signal, via the RF module 1014 and to the RH mirror controller, to extend, retract, fold, and/or unfold an RH mirror (e.g., in addition to extending, retracting, folding, and/or unfolding the LH mirror 1018). A buzzer 1016 may comprise any audio, visual, and/or vibration (e.g., haptic) indication of operation of the LH mirror controller 1000 and/or of the RH mirror controller 1050 (described further below). For example, the buzzer 1016 may emit a first audible noise to indicate activation and/or deactivation of the mirror tilt functionality. As another example, the buzzer 1016 may emit a second audible noise (e.g., which may be different from or the same as the first audible noise) to indicate activation and/or deactivation of one or more of the extending, retracting, folding, and/or unfolding functionalities. Additionally or alternatively, the buzzer 1016 may comprise a first visual indication (e.g., flash of light, activation of a light emitting diode (LED), etc.) of activation and/or deactivation of the mirror tilt functionality and/or a second visual indication (e.g., which may be different from or the same as the first visual indication) of activation and/or deactivation of one or more of the extending, retracting, folding, and/or unfolding functionalities Additionally or alternatively, the buzzer 1016 may comprise a vibration indication (e.g., haptic sensation, buzz, movement, etc.) of activation and/or deactivation of the mirror tilt functionality and/or a second vibration indication (e.g., which may be different from or the same as the first vibration indication) of activation and/or deactivation of one or more of the extending, retracting, folding, and/or unfolding functionalities. The buzzer 1016 may comprise one or more indications that may differ relative to one or more other indications. For example, the buzzer 1016 may be used for various purposes such that a first indication may be associated with a first event (e.g., failure of a first component) and/or a second indication may be associated with a second event (e.g., activation or deactivation of one or more functionalities). Any quantity of indications may be used to indicate any quantity of events. The buzzer 1016 may be used as a diagnostic indicator. For example, a first indication may be associated with a first diagnostic event (e.g., failure of a first component) and/or a second indication may be associated with a second diagnostic event (e.g., command error, low power indicator, communication error, etc.).

Figure 10B:
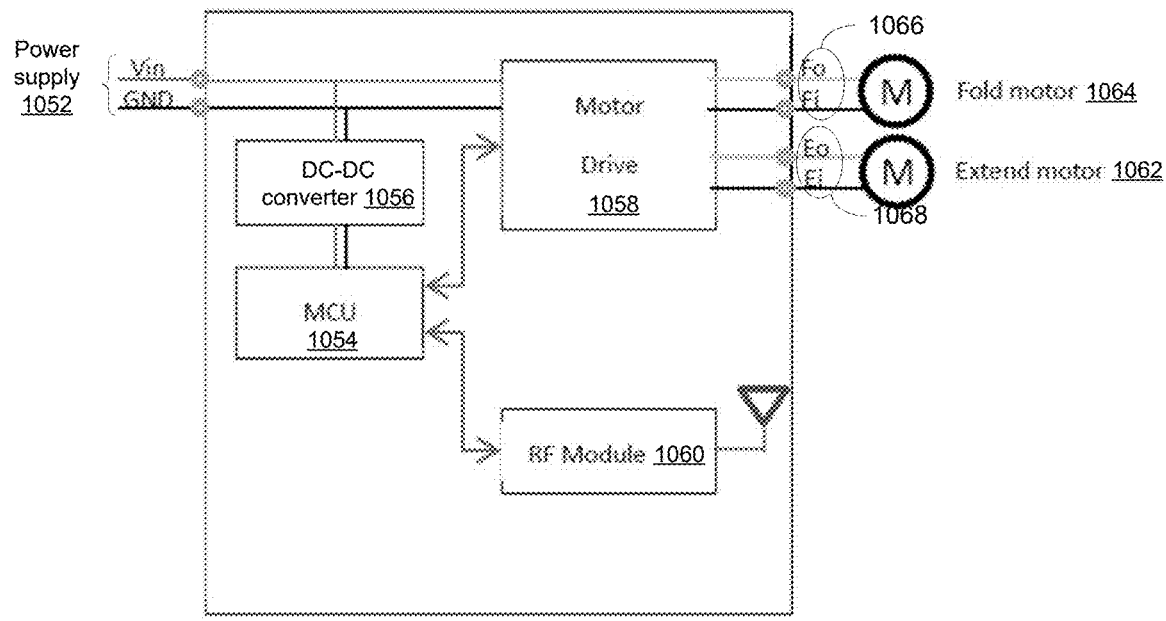
FIG. 10B shows an example architecture of a passenger-side side-view mirror controller.

FIG. 10B shows an example architecture of a passenger-side side-view mirror (e.g., RH mirror) controller. The RH mirror controller 1050 may communicate, via an RF module 1060, with the LH mirror controller 1000. The RF module 1060 may receive a signal, from the RF module 1014, indicating that the RH mirror is to be extended, retracted, folded, and/or unfolded. The MCU 1054 may process the received signal and send a signal to a motor drive 1058. The motor drive 1058 may control folding and unfolding of the RH mirror using a fold motor 1064. The motor drive 1058 may control extension and retraction of the RH mirror using an extend motor 1062. The LH mirror controller 1000 may be powered using a power supply 1052. A DC-DC converter 1056 may convert a voltage of the power supply 1052 to a voltage that is usable by components of the RH mirror controller 1050.

The LH mirror controller 1000 may send one or more signals, via the RF module 1014 to the RH mirror controller 1050, to cause folding, unfolding, extension, and/or retraction of the RH mirror, for example, if the mirror tilt functionality is deactivated, and/or if the power extend and/or power fold functionalities are activated. If a "down" input is received from the mirror tilt switch, the LH mirror controller 1000 may send a signal to the RH mirror controller 1050 to cause unfolding of the RH mirror. If an "up" input is received from the mirror tilt switch, the LH mirror controller 1000 may send a signal to the RH mirror controller 1050 to cause folding of the RH mirror. If a "left" input is received from the mirror tilt switch, the LH mirror controller 1000 may send a signal to the RH mirror controller 1050 to cause extension of the RH mirror. If a "right" input is received from the mirror tilt switch, the LH mirror controller 1000 may send a signal to the RH mirror controller 1050 to cause retraction of the RH mirror. Any other input may be used to fold, unfold, extend, or retract the RH mirror. The MCU 1054 of the RH mirror controller 1050 may send, based on receiving signals from the LH mirror controller 1000, one or more signals to the motor drive 1058 to cause folding, unfolding, extension, and/or retraction of the RH mirror. The motor drive 1058 may send, based on receiving the one or more signals from the MCU 1008, signal(s) to the fold motor 1064 and/or the power motor 1062 to cause folding, unfolding, extension, and/or retraction of the RH mirror.

The motor drive 1058 may be interfaced with the fold motor 1064 via one or more wires 1066, and/or with the extend motor 1062 via one or more wires 1068. The one or more wires 1066 may correspond to the one or more wires 758 (e.g., as described with reference to FIG. 7B) and/or the one or more wires 864 (e.g., as described with reference to FIG. 8B). The one or more wires 1068 may correspond to the one or more wires 756 (e.g., as described with reference to FIG. 7B) and/or the one or more wires 862 (e.g., as described with reference to FIG. 8B).

The motor drive 1010 and the motor drive 1058 are shown integrated with the LH mirror controller 1000, and the RH mirror controller 1050, in FIGS. 10A and 10B, respectively. However, in another arrangement, the motor drive 1010 and the motor drive 1058 may be a part of the LH mirror assembly or the RH mirror assembly.

Figure 11:
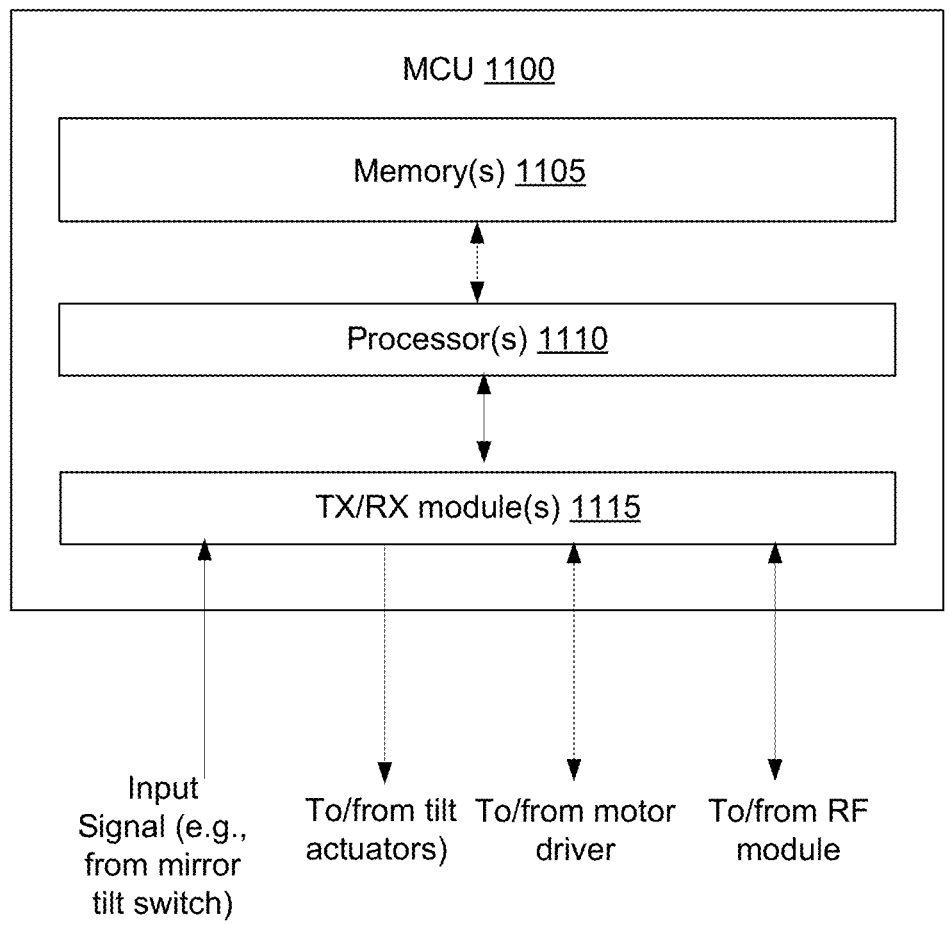
FIG. 11 shows an example micro-controller unit (MCU) as used in a mirror controller.

FIG. 11 shows an example MCU as may be used in a mirror controller. The example MCU 1100 may correspond to the MCU 1008 of the LH mirror controller 1000 and/or the MCU 1054 of the RH mirror controller 1050. The MCU 1100 may comprise one or more of processor(s) 1110, transmit/receive (TX/RX) module(s) 1115, and/or memory 1105. One or more data buses may interconnect the processor(s) 1110, the TX/RX module(s) 1115, and/or the memory 1105. The MCU 1008 may be implemented using one or more integrated circuits (ICs), software, or a combination thereof, configured to operate as described herein. Memory 1105 may comprise any memory such as a random-access memory (RAM), a read-only memory (ROM), a flash memory, or any other electronically readable memory, or the like.

Messages transmitted from and/or received by the MCU 1100 may be encoded in one or more data units. For example, the processor(s) 1110 may be configured to generate data units, and process received data units, that conform to any suitable wired and/or wireless communication protocol. The processor(s) of the MCU 1100 may be configured to execute machine readable instructions stored in memory 1105 to perform one or more operations described herein. The TX/RX module 1115 may be configured to receive input signals (e.g., from a mirror tilt switch), send/receive signals to/from mirror tilt actuators, send/receive signals to/from a motor drive, and/or send/receive signals to/from an RF module.

Figure 12A:
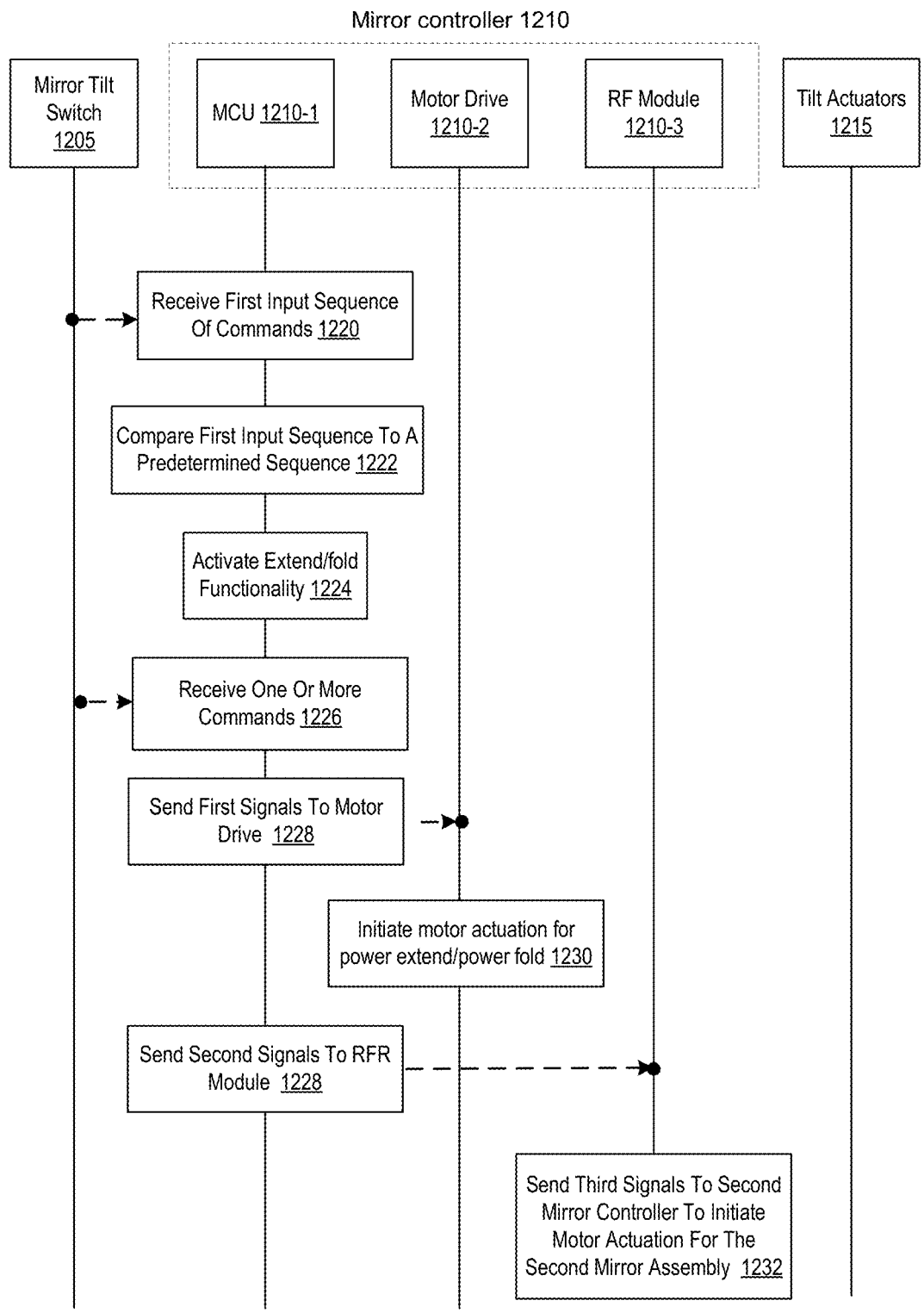
FIGS. 12A and 12B show an example event sequence for controlling positioning of side-view mirrors via a mirror tilt switch.
Figure 12B:
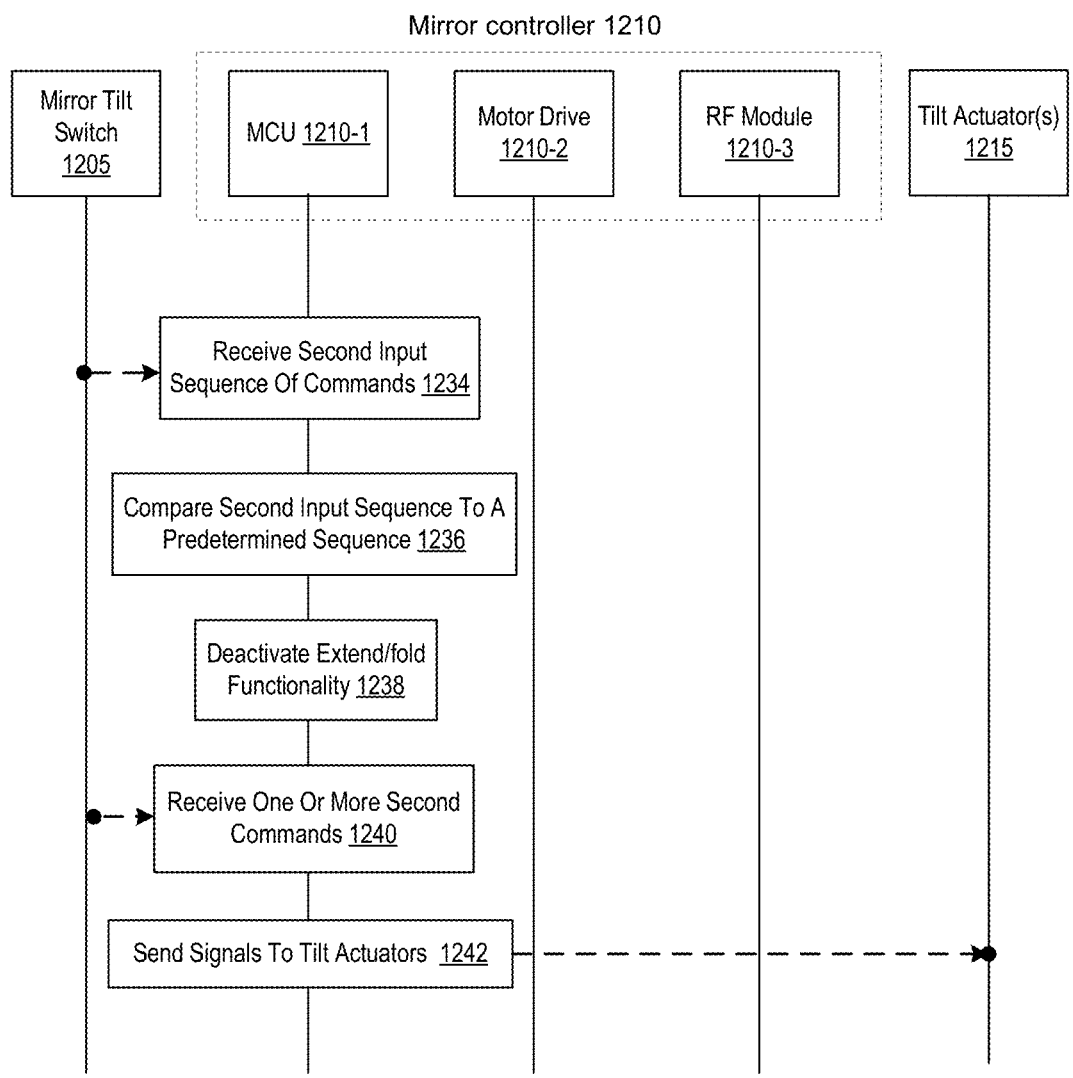

FIGS. 12A and 12B show an example event sequence for controlling positioning of side-view mirrors (e.g., the LH mirror and the RH mirror) via a mirror tilt switch. At step 1220, a mirror controller 1210 (e.g., an MCU 1210-1 associated with the mirror controller 1210) may receive a first input sequence of commands as input via a mirror tilt switch 1205. The mirror controller 1210 may be an LH mirror controller. At step 1222, the MCU 1210-1 may compare the first input sequence to a predetermined sequence. At step 1224, the MCU 1210-1 may activate power extend and/or power fold functionalities of the mirror controller 1210, and/or deactivate a mirror tilt functionality of the mirror controller 1210, for example, if the first input sequence is the same as the predetermined sequence (and/or satisfies an algorithm to confirm the first input sequence). At step 1226, the MCU 1210-1 may receive one or more commands as input via the mirror tilt switch 1205. At step 1228, based on the power extend and/or power fold functionalities being activated, the MCU 1210-1 may send one or more first signals to a motor drive 1210-2 associated with the mirror controller 1210 to cause extension, retraction, unfolding and/or folding of a sideview mirror (e.g., an LH mirror) in accordance with the one or more commands. At step 1230, the motor drive 1210-2 may initiate actuation of a fold motor and/or an extend motor to cause extension, retraction, unfolding and/or folding of the LH mirror in accordance with the one or more commands and based on receiving the one or more first signals.

At step 1232, the MCU 1210-1 may send one or more second signals to an RF module 1210-3, associated with the mirror controller 1210, to cause extension, retraction, unfolding and/or folding of a second sideview mirror (e.g., RH mirror). At step 1232, based on receiving the one or more second signals, the RF module 1210-3 may send one or more third signals to a second mirror controller (e.g., an RH mirror controller). The second mirror controller may initiate actuation of a fold motor and/or an extend motor (e.g., associated with the RH mirror) to cause extension, retraction, unfolding and/or folding of the RH mirror in accordance with the one or more commands and based on receiving the one or more third signals. Steps 1226 and 1228 may be performed simultaneously or substantially simultaneously, and/or steps 1230 and 1230 may be performed simultaneously or substantially simultaneously, such that a user of the mirror tilt switch 1205 may not notice a significant difference (if any) between operation of the first mirror assembly and operation of the second mirror assembly in response to the one or more commands received at step 1226.

At step 1234, the MCU 1210-1 may receive a second input sequence of commands as input via the mirror tilt switch 1205. At step 1236, the MCU 1210-1 may compare the second input sequence to the predetermined sequence. At step 1238, the MCU 1210-1 may deactivate the power extend and/or power fold functionalities of the mirror controller 1210, and activate the mirror tilt functionality of the mirror controller 1210, for example, if the second input sequence is the same as the predetermined sequence (and/or satisfies an algorithm to confirm the second input sequence). At step 1240, the MCU 1210-1 may receive one or more second commands as input via the mirror tilt switch 1205. At step 1242, based on the mirror tilt functionality being activated, the MCU 1210-1 may send one or more fourth signals to tilt actuator(s) 1215 to cause tilt of the LH mirror in accordance with the one or more second commands.

Figure 13:
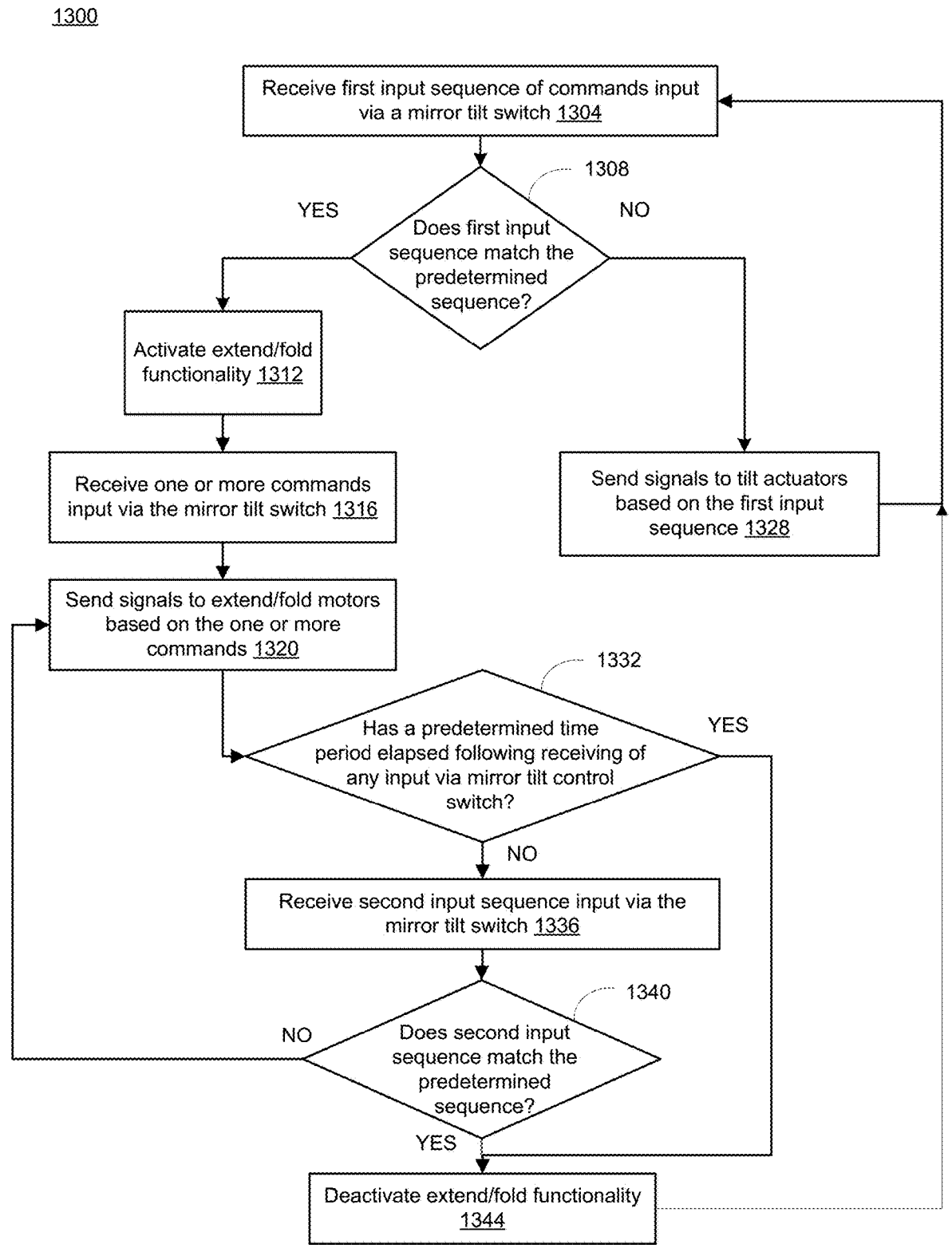
FIG. 13 shows an example method for controlling a positioning of a side-view mirror.

FIG. 13 shows an example method for controlling a positioning of a side-view mirror. The example method 1300 may be performed by a mirror controller associated with the side-view mirror. The mirror controller may be an LH mirror controller and the side-view mirror may be an LH mirror. In a normal state, a mirror tilt functionality of the LH mirror controller may be activated, and the power extend and/or power fold functionalities of the LH mirror controller may be deactivated.

At step 1304, the LH mirror controller may receive a first sequence of commands as input via a mirror tilt switch. At step 1308, the LH mirror controller may compare the first sequence to a predetermined sequence. At step 1312, the LH mirror controller may activate the power extend and/or power fold functionalities of the LH mirror controller, and/or deactivate the mirror tilt functionality of the LH mirror controller, for example, if the first sequence is the same as the predetermined sequence (and/or satisfies an algorithm to confirm the first input sequence). At step 1328, the LH mirror controller may send one or more signals to one or more tilt actuators of the LH mirror based on the first sequence, for example, if the first sequence is not the same as the predetermined sequence (and/or does not satisfy an algorithm to confirm the first input sequence). For example, the LH mirror controller may determine that the mirror tilt functionality remains activated and send one or more signals to one or more tilt actuators of the LH mirror based on the first sequence.

At step 1316, the LH mirror controller may receive one or more commands input via the mirror tilt control switch. At step 1320, and based on the LH mirror controller activating the power extend and/or power fold functionalities, the LH mirror controller may send one or more signals to extend and/or fold motors to extend, retract, fold, and/or unfold the LH mirror in accordance with the one or more commands.

At step 1332, the LH mirror controller may determine whether a predetermined time period has elapsed following the reception of a command (or any commands) input via the mirror tilt switch. For example, the LH mirror controller may determine whether a predetermined time period has elapsed following the reception of the one or more commands without receiving any additional commands input via the mirror tilt switch. At step 1344, the LH mirror controller may deactivate the power extend and/or power fold functionalities, and/or activate the mirror tilt functionality of the LH mirror controller, based on determining that the predetermined time period has elapsed following the reception of the one or more commands without receiving any additional commands.

At step 1336, the LH mirror controller may receive (e.g., within the predetermined time period), a second sequence of commands as input via a mirror tilt switch. At step 1340, the LH mirror controller may compare the second sequence to the predetermined sequence. At step 1344, the LH mirror controller may deactivate the power extend and/or power fold functionalities of the LH mirror controller, and/or activate the mirror tilt functionality of the LH mirror controller, for example, if the second sequence is the same as the predetermined sequence (and/or satisfies an algorithm to confirm the second input sequence). If the second sequence is not the same as the predetermined sequence (and/or does not satisfy an algorithm to confirm the second input sequence), the power extend and/or power fold functionalities of the LH mirror controller may remain activated. In this scenario, the LH mirror controller may send one or more signals to extend and/or fold motors to extend, retract, fold, and/or unfold the LH mirror in accordance with the second sequence of commands (step 1320). One or more of the return loops from steps 1344, 1340, and/or 1328 to an earlier step may (or may not) be repeated, for example, based on a time duration and/or based on a quantity of steps and/or loops that have already been performed.

Figure 14:
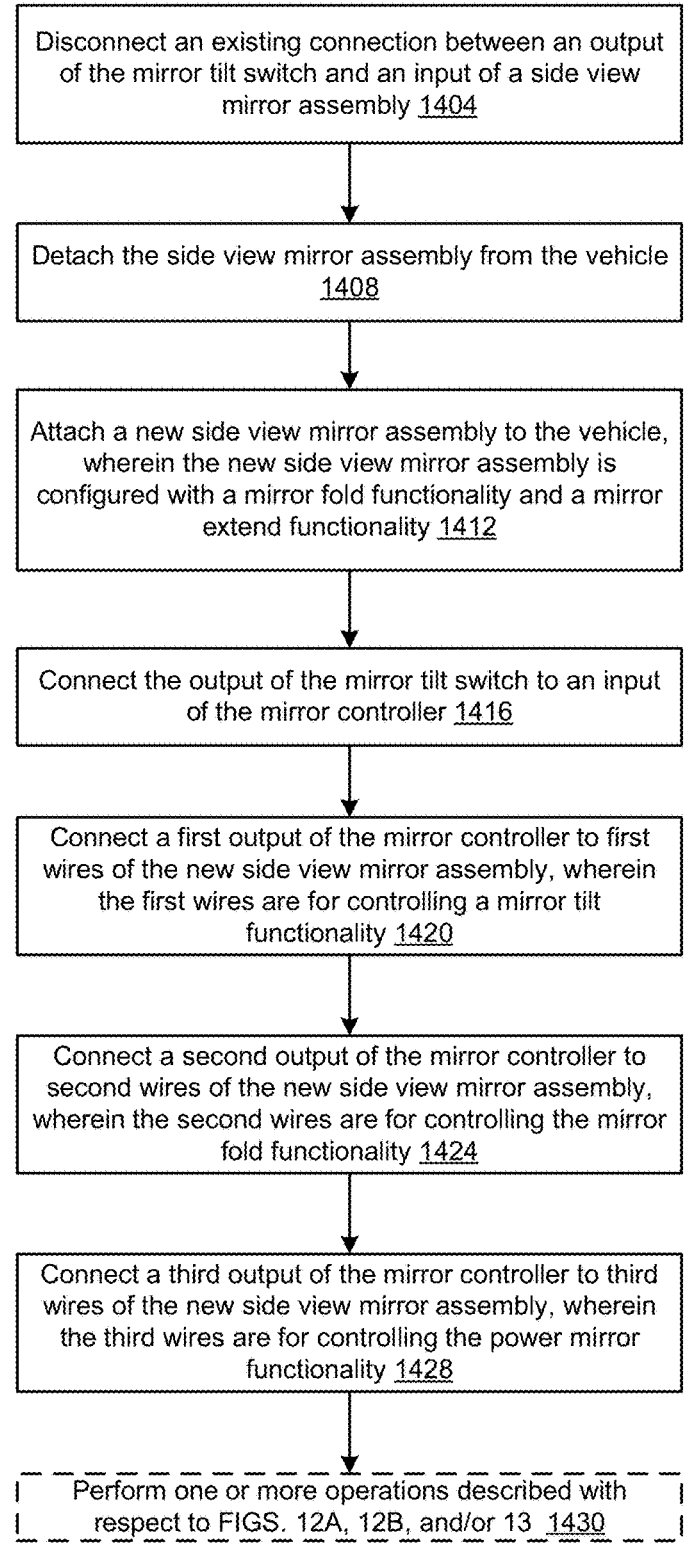
FIG. 14 shows an example method for installing a mirror controller and associated side-view mirror assembly in a vehicle.

FIG. 14 shows an example method for installation of a mirror controller and associated side-view mirror assembly in a vehicle. The example method 1400 may comprise configuration of and/or use of the mirror controller and/or associated side-view mirror assembly. The example method 1400 may comprise a plurality of steps for attaching a first side-view mirror assembly and wiring an associated mirror controller (e.g., the LH mirror controller 702, 802, 904, or 1000) to the first side-view mirror assembly. The first side-view mirror assembly may be configured for power extend and/or power fold functionalities, in addition to the mirror tilt functionality. The vehicle may be factory equipped with a second side-view mirror assembly, wired to a mirror tilt switch (e.g., similar to the mirror tilt switch 602). The second side-view mirror assembly may only be configured with a mirror tilt functionality which may be controllable via the mirror tilt switch.

At step 1404, an existing connection between an input of the second side-view mirror assembly and the mirror tilt switch may be disconnected. At step 1408, the second side-view mirror assembly may be detached from the vehicle. At step 1412, the first side-view mirror assembly may be attached to the vehicle. At step 1416, the output of the mirror tilt switch may be connected to an input of the mirror controller (e.g., the one or more wires 730, the one or more wires 820, the switch input 1004).

At step 1420, a first output of the mirror controller (e.g., the one or more wires 728, the one or more wires 818, the output signal 1012) may be connected to one or more first wires of the first side-view mirror assembly (e.g., the one or more wires 716, the one or more wires 826, the one or more wires 1024). The one or more first wires may be controlling a mirror tilt functionality of the first side-view mirror assembly.

At step 1424, a second output of the mirror controller (e.g., the one or more wires 726, the one or more wires 824, a first output from motor drive 1010) may be connected to one or more second wires of the first side-view mirror assembly (e.g., the one or more wires 720, the one or more wires 832, the one or more wires 1028). The one or more second wires may be controlling a power fold functionality of the first side-view mirror assembly.

At step 1428, a third output of the mirror controller (e.g., the one or more wires 724, the one or more wires 822, a second output from motor drive 1010) may be connected to one or more third wires of the first side-view mirror assembly (e.g., the one or more wires 718, the one or more wires 830, the one or more wires 1026). The one or more third wires may be controlling a power extend functionality of the first side-view mirror assembly. One or more steps of method 1400 may not be performed (e.g., may be optional). For example, the method 1400 may be applied to a vehicle with side view mirror assemblies that may not be removed or replaced (e.g., steps 1412 may not be performed) and that may be adapted for connection with one or more of the mirror controllers described herein. One or more steps of method 1400 may be repeated for one or more side-view mirror assemblies (e.g., some or all steps of method 1400 may be repeated for a second side-mirror and/or a second mirror controller). Additional steps, not shown in FIG. 14, may be performed in connection with method 1400, including, for example, any steps and/or procedures described herein.

At step 1430, one or more operations described herein with respect to FIG. 12A, FIG. 12B, and/or FIG. 13 may be performed. Step 1430 may be optional. Step 1430 may be performed at any time duration after step 1428, and/or may be repeated any number of times. As an example, step 1430 may comprise inputting, via the mirror tilt switch, a first sequence for activation of at least one of the mirror fold functionality or the mirror extend functionality. As an example, step 1430 may comprise, after activation of the at least one of the mirror fold functionality or the mirror extend functionality, inputting via the mirror tilt switch one or more commands to cause: unfolding or folding of the first side-view mirror; or extension of retraction of the first side-view mirror. Any steps described herein may be performed as step 1430. Additionally or alternatively, a process may end at step 1428 without implementing step 1430.

A mirror controller for controlling side-view mirror positioning in a vehicle may be provided as described herein. The mirror controller may comprise at least one processor; a communication interface communicatively coupled to the at least one processor; and/or memory storing computer-readable instructions that, when executed by the at least one processor, cause the mirror controller to perform one or more functions. The functions may comprise: receiving, via the communication interface and from a mirror tilt switch, a first input sequence; comparing the first input sequence to a predetermined sequence; based on the first input sequence matching the predetermined sequence, activating power extend and power fold functionalities of the mirror controller, and/or deactivating a mirror tilt functionality of the mirror controller; after activating the power extend and power fold functionalities of the mirror controller, receiving one or more commands via the mirror tilt switch; and/or based on the one or more commands, sending one or more signals configured to cause: unfolding or folding of a side-view mirror; or extension or retraction of the side-view mirror. The mirror controller may be configured to: receive, via the communication interface and from the mirror tilt switch, a second input sequence; compare the second input sequence to the predetermined sequence; and/or based on the second input sequence matching the predetermined sequence, deactivate the power extend and power fold functionalities of the mirror controller, and/or reactivate the mirror tilt functionality of the mirror controller. The mirror controller may be configured to send the one or more signals to one or more motors. The mirror controller may be configured to: based on a determination that a predetermined period of time has elapsed following reception of the one or more commands without receiving any additional command, deactivate the power extend and power fold functionalities of the mirror controller, and/or reactivate the mirror tilt functionality of the mirror controller. The mirror controller may be configured to: after deactivation of the power extend and power fold functionality of the mirror controller, receive, via the communication interface and from the mirror tilt switch, one or more second commands; and/or based on the one or more second commands, send one or more second signals configured to cause the side-view mirror to tilt along one or more axes. The mirror controller may be configured to send the one or more second signals to one or more tilt actuators. The mirror controller may be configured to delay one or more communications such that the mirror tilt functionality of the mirror controller is disabled during at least one of: reception of the first input sequence, comparison of the first input sequence to the predetermined sequence, or activation of the power extend and power fold functionalities. The mirror controller may comprise a wireless communication interface, wherein the computer-readable instructions, when executed by the at least one processor, may cause the mirror controller to: send, via the wireless communication interface and based on the one or more commands, one or more second signals to a second mirror controller. The one or more second signals may cause the second mirror controller to send one or more third signals to cause: unfolding or folding of a second side-view mirror; and/or extension or retraction of the second side-view mirror. The side-view mirror may comprise a driver-side side-view mirror of the vehicle; and/or the second side-view mirror may comprise a passenger-side side-view mirror of the vehicle.

A system for controlling side-view mirror positioning in a vehicle may be provided as described herein. The system may comprise: a side-view mirror assembly of a vehicle; and a mirror controller. The side-view mirror assembly may comprise: one or more motors for folding, unfolding, extending, and retracting a side-view mirror, and/or one or more tilt actuators for controlling the tilt of the side-view mirror along one or more axes. The mirror controller may be configured to be connected to the one or more motors, the one or more tilt actuators, and/or a mirror tilt switch for controlling operation of at least the one or more tilt actuators. The mirror controller may comprise at least one processor; a communication interface communicatively coupled to the at least one processor; and/or memory storing computer-readable instructions that, when executed by the at least one processor, cause the mirror controller to: receive, via the communication interface and from a mirror tilt switch, a first input sequence; compare the first input sequence to a predetermined sequence; based on the first input sequence matching the predetermined sequence, activate power extend and power fold functionalities of the mirror controller, and/or deactivate a mirror tilt functionality of the mirror controller; after activating the power extend and power fold functionalities of the mirror controller, receive one or more commands via the mirror tilt switch; and/or based on the one or more commands, send one or more signals to the one or more motors to cause: unfolding or folding of a side-view mirror; and/or extension or retraction of the side-view mirror. The mirror controller may be configured to: receive, via the communication interface and from the mirror tilt switch, a second input sequence; compare the second input sequence to the predetermined sequence; and/or based on the second input sequence matching the predetermined sequence, deactivate the power extend and power fold functionalities of the mirror controller, and/or reactivate the mirror tilt functionality of the mirror controller. The mirror controller may be configured to send the one or more signals to one or more motors. The mirror controller may be configured to: based on a determination that a predetermined period of time has elapsed following reception of the one or more commands without receiving any additional command, deactivate the power extend and power fold functionalities of the mirror controller, and/or reactivate the mirror tilt functionality of the mirror controller. The mirror controller may be configured to: after deactivation of the power extend and power fold functionality of the mirror controller, receive, via the communication interface and from the mirror tilt switch, one or more second commands; and/or based on the one or more second commands, send one or more second signals to the one or more tilt actuators to cause the side-view mirror to tilt along one or more axes. The mirror controller may be configured to send the one or more second signals to one or more tilt actuators. The mirror controller may be configured to delay one or more communications such that the mirror tilt functionality of the mirror controller is disabled during at least one of: reception of the first input sequence, comparison of the first input sequence to the predetermined sequence, or activation of the power extend and power fold functionalities. The system may comprise a wireless communication interface, wherein the computer-readable instructions, when executed by the at least one processor, cause the mirror controller to: send, via the wireless communication interface and based on the one or more commands, one or more second signals to a second mirror controller. The one or more second signals may cause the second mirror controller to send one or more third signals to cause: unfolding or folding of a second side-view mirror; and/or extension or retraction of the second side-view mirror. The side-view mirror may comprise a driver-side side-view mirror of the vehicle. The second side-view mirror may comprise a passenger-side side-view mirror of the vehicle.

A method for installation of a mirror controller and an associated one or more mirrors may be provided as described herein. A first side-view mirror assembly may be installed in a vehicle. The first side-view mirror assembly may comprise: a side-view mirror; one or more first wires for controlling a mirror tilt functionality; one or more second wires for controlling a mirror fold functionality; one or more third wires for controlling a mirror extend functionality; and/or one or more motors, configured to be connected to the one or more first wires, the one or more second wires, and/or the one or more third wires, for controlling a tilt of the side-view mirror, extending and/or retracting the side-view mirror, and/or unfolding and/or folding the side-view mirror. The method may comprise: disconnecting an existing connection between an output of a mirror tilt switch located in the vehicle and an input of a second side-view mirror assembly; detaching the second side-view mirror assembly from the vehicle; attaching the first side-view mirror assembly to the vehicle; connecting the output of the mirror tilt switch to an input of the mirror controller; connecting a first output of the mirror controller to the first wires of the first side-view mirror assembly; connecting a second output of the mirror controller to the second wires of the first side-view mirror assembly; and/or connecting a third output of the mirror controller to the third wires of the first side-view mirror assembly. The first side-view mirror assembly may comprise one or more fourth wires for controlling one or more other functionalities of the side-view mirror. The method may comprise connecting one or more other outputs from one or more other controllers to the one or more fourth wires. The one or more other controllers may comprise one or more of: a controller associated with a mirror defrost functionality of the first side-view mirror assembly; a controller associated with a blind spot indicator in the first side-view mirror assembly; and/or a controller associated with a turn indicator in the first side-view mirror assembly. The method may comprise connecting a power supply to the mirror controller. The power supply may be configured to power one or more other functions of the vehicle. The method may further comprise attaching a third side-view mirror assembly to the vehicle, wherein the third side-view mirror assembly may be a passenger-side side-view mirror assembly and wherein the first side-view mirror assembly may be a driver-side side-view mirror assembly. The method may further comprise connecting one or more wires of the passenger-side side-view mirror assembly to a second mirror controller configured to control functionality of the passenger-side side view mirror assembly via wireless communication with the mirror controller associated with the driver-side side-view mirror assembly. The method may comprise one or more steps described herein for configuration and/or use of the mirror controller and/or an associated one or more mirrors. The method may comprise inputting, via the mirror tilt switch, a first sequence for activation of at least one of the mirror fold functionality or the mirror extend functionality. The method may comprise, after activation of the at least one of the mirror fold functionality or the mirror extend functionality, inputting via the mirror tilt switch one or more commands to cause: unfolding or folding of the first side-view mirror; or extension of or retraction of the first side-view mirror.

Example methods, devices, and systems described herein enable integration of a side-view mirror assembly, with power extend and power fold functionalities, in a vehicle that is factory-equipped with only a mirror tilt switch. A mirror controller may be interfaced between the mirror tilt switch and the side-view mirror assembly. The mirror controller may be operated, based on input from the mirror tilt switch, to control the power extend and power fold functionalities of the side-view mirror, or to control the mirror tilt functionality of the side-view mirror. Using the same mirror tilt switch to control all functionalities of the side-view mirror ensures that a separate controller and switch interface is not required to control power extend and power fold functionalities. The vehicle power supply may used to power the mirror controller and the mirror tilt switch, thereby eliminating the need for a separate power supply (e.g., batteries). Further, the mirror controller may be configured to wirelessly communicate with one or more other mirror controllers in the vehicle, thereby eliminating the need to emplace separate wired connections to control power extend and power fold functionalities of other side-view mirrors.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, and/or an embodiment combining software, hardware, and firmware aspects in any combination. Various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may comprise one or more non-transitory computer-readable media.

Aspects of the disclosure have been described in terms of example embodiments. Other embodiments, modifications, and/or variations within the scope and spirit of the appended claims will be evident to persons of ordinary skill in the art. For example, one or more of the steps depicted in the example figures may be performed in a different order, one or more steps described with respect to one figure may be used in combination with one or more steps described with respect to another figure, and/or one or more described steps may be optional.

The invention claimed is:

1. A mirror controller for controlling side-view mirror positioning in a vehicle, comprising:
at least one processor;
a communication interface communicatively coupled to the at least one processor; and
memory storing computer-readable instructions that, when executed by the at least one processor, cause the mirror controller to:
receive, via the communication interface and from a mirror tilt switch, a first input sequence;
compare the first input sequence to a predetermined sequence;
based on the first input sequence matching the predetermined sequence, activate power extend and power fold functionalities of the mirror controller and deactivate a mirror tilt functionality of the mirror controller;
after activating the power extend and power fold functionalities of the mirror controller, receive one or more commands via the mirror tilt switch; and
based on the one or more commands, send one or more signals configured to cause:
unfolding or folding of a side-view mirror; or
extension or retraction of the side-view mirror.

2. The mirror controller of claim 1, wherein the computer-readable instructions, when executed by the at least one processor, cause the mirror controller to:
receive, via the communication interface and from the mirror tilt switch, a second input sequence;
compare the second input sequence to the predetermined sequence; and
based on the second input sequence matching the predetermined sequence, deactivate the power extend and power fold functionalities of the mirror controller and reactivate the mirror tilt functionality of the mirror controller.

3. The mirror controller of claim 1, wherein the computer-readable instructions, when executed by the at least one processor, cause the mirror controller to send the one or more signals by sending the one or more signals to one or more motors.

4. The mirror controller of claim 1, wherein the computer-readable instructions, when executed by the at least one processor, cause the mirror controller to:
based on a determination that a predetermined period of time has elapsed following reception of the one or more commands without receiving an additional command, deactivate the power extend and power fold functionalities of the mirror controller and reactivate the mirror tilt functionality of the mirror controller.

5. The mirror controller of claim 4, wherein the computer-readable instructions, when executed by the at least one processor, cause the mirror controller to:
after deactivation of the power extend and power fold functionality of the mirror controller, receive, via the communication interface and from the mirror tilt switch, one or more second commands; and based on the one or more second commands, send one or more second signals configured to cause the side-view mirror to tilt along one or more axes.

6. The mirror controller of claim 1, wherein the computer-readable instructions, when executed by the at least one processor, cause the mirror controller to delay one or more communications such that the mirror tilt functionality of the mirror controller is disabled during at least one of:
reception of the first input sequence;
comparison of the first input sequence to the predetermined sequence; or
activation of the power extend and power fold functionalities.

7. The mirror controller of claim 1, further comprising a wireless communication interface, wherein the computer-readable instructions, when executed by the at least one processor, cause the mirror controller to:
send, via the wireless communication interface and based on the one or more commands, one or more second signals to a second mirror controller, wherein the one or more second signals cause the second mirror controller to send one or more third signals to cause:
unfolding or folding of a second side-view mirror; or
extension or retraction of the second side-view mirror.

8. The mirror controller of claim 7, wherein:
the side-view mirror is a driver-side side-view mirror of the vehicle; and
the second side-view mirror is a passenger-side side-view mirror of the vehicle.

9. A system, comprising:
a side-view mirror assembly of a vehicle, wherein the side-view mirror assembly comprises:
one or more motors for folding, unfolding, extending, and retracting a side-view mirror, and
one or more tilt actuators for controlling tilt of the side-view mirror along one or more axes; and
a mirror controller configured to be connected to the one or more motors, the one or more tilt actuators, and a mirror tilt switch for controlling operation of at least the one or more tilt actuators, wherein the mirror controller comprises:
at least one processor;
a communication interface communicatively coupled to the at least one processor; and
memory storing computer-readable instructions that, when executed by the at least one processor, cause the mirror controller to:
receive, via the communication interface and from the mirror tilt switch, a first input sequence;
compare the first input sequence to a predetermined sequence;
based on the first input sequence matching the predetermined sequence, activate power extend and power fold functionalities of the mirror controller and deactivate a mirror tilt functionality of the mirror controller;
after activating the power extend and power fold functionalities of the mirror controller, receive one or more commands via the mirror tilt switch; and
based on the one or more commands, send one or more signals to the one or more motors to cause:
unfolding or folding of a side-view mirror; or
extension or retraction of the side-view mirror.

10. The system of claim 9, wherein the computer-readable instructions, when executed by the at least one processor, cause the mirror controller to:
receive, via the communication interface and from the mirror tilt switch, a second input sequence;
compare the second input sequence to the predetermined sequence; and
based on the second input sequence matching the predetermined sequence, deactivate the power extend and power fold functionalities of the mirror controller and reactivate the mirror tilt functionality of the mirror controller.

11. The system of claim 9, wherein the computer-readable instructions, when executed by the at least one processor, cause the mirror controller to send the one or more signals by sending the one or more signals to one or more motors.

12. The system of claim 9, wherein the computer-readable instructions, when executed by the at least one processor, cause the mirror controller to:
based on a determination that a predetermined period of time has elapsed following reception of the one or more commands without receiving an additional command, deactivate the power extend and power fold functionalities of the mirror controller and reactivate the mirror tilt functionality of the mirror controller.

13. The system of claim 12, wherein the computer-readable instructions, when executed by the at least one processor, cause the mirror controller to:
after deactivation of the power extend and power fold functionality of the mirror controller, receive, via the communication interface and from the mirror tilt switch, one or more second commands; and
based on the one or more second commands, send one or more second signals to the one or more tilt actuators to cause the side-view mirror to tilt along one or more axes.

14. The system of claim 9, wherein the computer-readable instructions, when executed by the at least one processor, cause the mirror controller to delay one or more communications such that the mirror tilt functionality of the mirror controller is disabled during at least one of:
reception of the first input sequence;
comparison of the first input sequence to the predetermined sequence; or
activation of the power extend and power fold functionalities.

15. The system of claim 9, further comprising a wireless communication interface, wherein the computer-readable instructions, when executed by the at least one processor, cause the mirror controller to:
send, via the wireless communication interface and based on the one or more commands, one or more second signals to a second mirror controller, wherein the one or more second signals cause the second mirror controller to send one or more third signals to cause:
unfolding or folding of a second side-view mirror; or
extension or retraction of the second side-view mirror.

16. The system of claim 15, wherein:
the side-view mirror is a driver-side side-view mirror of the vehicle; and
the second side-view mirror is a passenger-side side-view mirror of the vehicle.

* * * * *